(12) United States Patent
McCusker

(10) Patent No.: US 8,515,600 B1
(45) Date of Patent: Aug. 20, 2013

(54) SYSTEM AND METHOD FOR SENSOR-BASED TERRAIN AVOIDANCE

(75) Inventor: Patrick Dennis McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 635 days.

(21) Appl. No.: 11/851,323

(22) Filed: Sep. 6, 2007

(51) Int. Cl.
  *G01C 5/00* (2006.01)
  *G08B 23/00* (2006.01)

(52) U.S. Cl.
  USPC ............................................. 701/9; 340/963

(58) Field of Classification Search
  USPC ............... 701/1–18, 120, 300, 301; 340/970, 340/961, 963, 968, 945, 971, 977, 979, 967, 340/951; 342/26 R–26 D, 175, 176, 89–103, 342/192–197, 61–65, 26 B, 33, 47, 118–146, 342/113, 357.53; 244/181, 76 R, 90 R, 220, 244/221, 179–197
  See application file for complete search history.

(56) References Cited

U.S. PATENT DOCUMENTS

| | | | |
|---|---|---|---|
| 5,047,779 A * | 9/1991 | Hager | 342/120 |
| 5,920,276 A | 7/1999 | Frederick | |
| 5,945,926 A | 8/1999 | Ammar et al. | |
| 5,978,715 A | 11/1999 | Briffe et al. | |
| 6,064,942 A | 5/2000 | Johnson et al. | |
| 6,128,553 A | 10/2000 | Gordon et al. | |
| 6,150,901 A | 11/2000 | Auken | |
| 6,154,151 A | 11/2000 | McElreath et al. | |
| 6,163,021 A | 12/2000 | Mickelson | |
| 6,166,661 A | 12/2000 | Anderson et al. | |
| 6,169,770 B1 | 1/2001 | Henely | |
| 6,178,391 B1 | 1/2001 | Anderson et al. | |
| 6,194,980 B1 | 2/2001 | Thon | |
| 6,201,494 B1 | 3/2001 | Kronfeld | |
| 6,233,522 B1 | 5/2001 | Morici | |
| 6,259,400 B1 | 7/2001 | Higgins et al. | |
| 6,266,114 B1 | 7/2001 | Skarohlid | |
| 6,281,832 B1 | 8/2001 | McElreath | |
| 6,285,298 B1 | 9/2001 | Gordon | |
| 6,285,337 B1 | 9/2001 | West et al. | |
| 6,285,926 B1 | 9/2001 | Weiler et al. | |
| 6,311,108 B1 | 10/2001 | Ammar et al. | |
| 6,317,468 B1 | 11/2001 | Meyer | |

(Continued)

FOREIGN PATENT DOCUMENTS

DE 19649838 * 4/1998

OTHER PUBLICATIONS

Notice of Allowance for U.S. Appl. No. 11/900,002, mail date Sep. 14, 2010, 5 pages.

(Continued)

*Primary Examiner* — James Trammell
*Assistant Examiner* — Muhammad Shafi
(74) *Attorney, Agent, or Firm* — Donna P. Suchy; Daniel M. Barbieri

(57) ABSTRACT

A system and method for a terrain awareness warning system. The system includes a radar system configured to transmit a first radio frequency wave and receive a second radio frequency wave and a display for receiving a display signal representative of a terrain and a terrain awareness warning system. The terrain awareness warning system includes a forward-looking terrain logic configured to be in communication with the radar system and to process a terrain signal from the radar system.

20 Claims, 18 Drawing Sheets

(56) References Cited

U.S. PATENT DOCUMENTS

| | | |
|---|---|---|
| 6,345,127 B1 | 2/2002 | Mitchell |
| 6,377,892 B1 | 4/2002 | Johnson et al. |
| 6,388,607 B1 | 5/2002 | Woodell |
| 6,388,608 B1 | 5/2002 | Woodell et al. |
| 6,421,603 B1 * | 7/2002 | Pratt et al. .................. 701/206 |
| 6,424,288 B1 | 7/2002 | Woodell |
| 6,426,717 B1 | 7/2002 | Maloratsky |
| 6,441,773 B1 | 8/2002 | Kelly et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,473,240 B1 | 10/2002 | Dehmlow |
| 6,492,934 B1 | 12/2002 | Hwang et al. |
| 6,501,424 B1 | 12/2002 | Haendel et al. |
| 6,512,476 B1 | 1/2003 | Woodell |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,603,425 B1 | 8/2003 | Woodell |
| 6,650,275 B1 | 11/2003 | Kelly et al. |
| 6,653,947 B2 | 11/2003 | Dwyer et al. |
| 6,690,298 B1 | 2/2004 | Barber et al. |
| 6,690,299 B1 | 2/2004 | Suiter |
| 6,714,186 B1 | 3/2004 | Mosier et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,771,626 B1 | 8/2004 | Golubiewski et al. |
| 6,804,614 B1 | 10/2004 | McGraw et al. |
| 6,806,846 B1 | 10/2004 | West |
| 6,819,983 B1 | 11/2004 | McGraw |
| 6,822,617 B1 | 11/2004 | Mather et al. |
| 6,839,017 B1 | 1/2005 | Dillman |
| 6,850,185 B1 | 2/2005 | Woodell |
| 6,862,501 B2 | 3/2005 | He |
| 6,865,452 B2 | 3/2005 | Burdon |
| 6,879,280 B1 | 4/2005 | Bull et al. |
| 6,882,302 B1 | 4/2005 | Woodell et al. |
| 6,918,134 B1 | 7/2005 | Sherlock et al. |
| 6,950,062 B1 | 9/2005 | Mather et al. |
| 6,972,727 B1 | 12/2005 | West et al. |
| 6,977,608 B1 | 12/2005 | Anderson et al. |
| 6,992,614 B1 * | 1/2006 | Joyce ........................... 342/122 |
| 6,995,726 B1 | 2/2006 | West et al. |
| 6,998,908 B1 | 2/2006 | Sternowski |
| 6,999,022 B1 | 2/2006 | Vesel et al. |
| 7,002,546 B1 | 2/2006 | Stuppi et al. |
| 7,034,753 B1 | 4/2006 | Elsallal et al. |
| 7,042,387 B2 | 5/2006 | Ridenour et al. |
| 7,064,680 B2 | 6/2006 | Reynolds et al. |
| 7,089,092 B1 | 8/2006 | Wood et al. |
| 7,092,645 B1 | 8/2006 | Sternowski |
| 7,109,912 B1 | 9/2006 | Paramore et al. |
| 7,109,913 B1 | 9/2006 | Paramore et al. |
| 7,129,885 B1 | 10/2006 | Woodell et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,196,329 B1 | 3/2007 | Wood et al. |
| 7,205,933 B1 | 4/2007 | Snodgrass |
| 7,219,011 B1 | 5/2007 | Barber |
| 7,242,343 B1 | 7/2007 | Woodell |
| 7,272,472 B1 | 9/2007 | McElreath |
| 7,292,178 B1 | 11/2007 | Woodell et al. |
| 7,312,725 B2 | 12/2007 | Berson et al. |
| 7,312,743 B2 | 12/2007 | Ridenour et al. |
| 7,486,291 B2 | 2/2009 | Berson et al. |
| 7,570,177 B2 | 8/2009 | Reynolds et al. |
| 7,633,430 B1 | 12/2009 | Wichgers et al. |
| 7,639,175 B1 | 12/2009 | Woodell |
| 7,675,461 B1 | 3/2010 | Mccusker et al. |
| 7,733,264 B1 | 6/2010 | Woodell et al. |
| 7,783,427 B1 | 8/2010 | Woodell et al. |
| 7,859,448 B1 | 12/2010 | Woodell et al. |
| 7,859,449 B1 | 12/2010 | Woodell et al. |
| 2003/0071828 A1 | 4/2003 | Wilkins et al. |
| 2003/0216859 A1 * | 11/2003 | Martell et al. ................. 701/210 |
| 2004/0044445 A1 | 3/2004 | Burdon |
| 2004/0059473 A1 | 3/2004 | He |
| 2004/0083038 A1 | 4/2004 | He |
| 2004/0181318 A1 * | 9/2004 | Redmond et al. .................. 701/9 |
| 2005/0174350 A1 * | 8/2005 | Ridenour et al. ............. 345/440 |
| 2006/0097895 A1 * | 5/2006 | Reynolds et al. ............. 340/961 |
| 2006/0227012 A1 | 10/2006 | He |
| 2006/0290531 A1 | 12/2006 | Reynolds et al. |
| 2007/0060063 A1 * | 3/2007 | Wright et al. ................. 455/66.1 |
| 2009/0207048 A1 | 8/2009 | He et al. |
| 2010/0033499 A1 | 2/2010 | Gannon et al. |

OTHER PUBLICATIONS

Notice of Allowance for U.S. Appl. No. 11/899,801, mail date Aug. 19, 2010, 5 pages.

U.S. Appl. No. 11/900,002, filed Sep. 6, 2007, Woodell et al.

U.S. Appl. No. 11/899,801, filed Sep. 6, 2007, Woodell et al.

"Technical Standard Order," TSO-C115b, Airborne Area Navigation Equipment Using Multi-Sensor Inputs, Sep. 30, 1994, 11 pages, Department of Transportation, Federal Aviation Administration, Washington, DC.

Fountain, J.R., Digital Terrain Systems, Airborne Navigation Systems Workshop (Digest No. 1997/169), IEE Colloquium, pp. 4/1-4/6, Feb. 21, 1997.

Johnson, A., et al., Vision Guided Landing of an Autonomous Helicopter in Hazardous Terrain, Robotics and Automation, 2005. ICRA 2005. Proceedings of the 2005 IEEE International Conference on Robotics and Automation, pp. 3966-3971, Apr. 18-22, 2005.

Office Action for U.S. Appl. No. 11/899,801, mail date May 12, 2010, 7 pages.

Office Action for U.S. Appl. No. 11/900,002, mail date Jun. 8, 2010, 7 pages.

Vadlamani, A., et al., Improving the detection capability of spatial failure modes using downward-looking sensors in terrain database integrity monitors, Digital Avionics Systems Conference, 2003. The 22nd, vol. 2, pp. 9C.5-1 to 9C.5-12, vol. 2, Oct. 12-16, 2003.

* cited by examiner

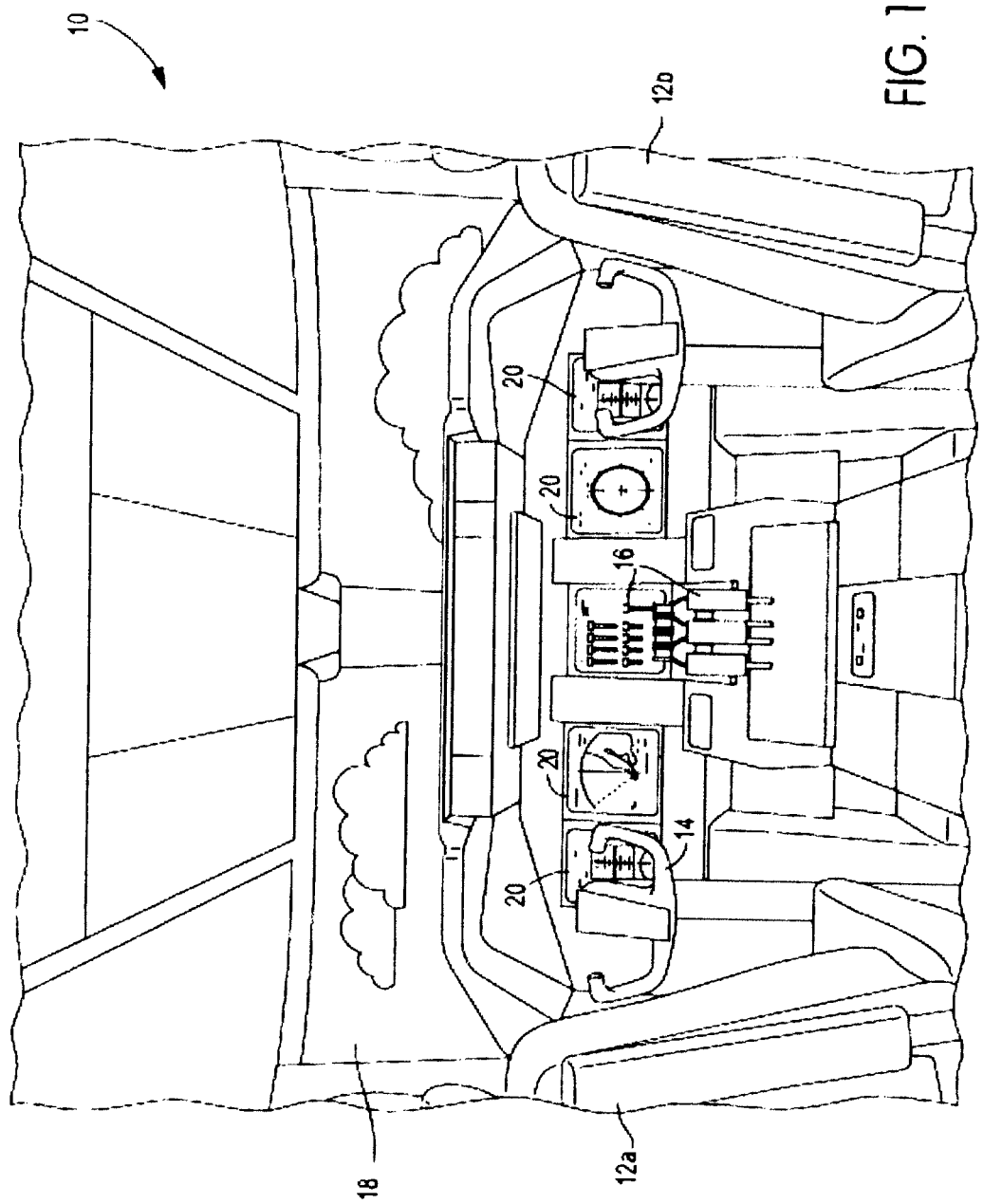

SYSTEM AND METHOD FOR SENSOR-BASED TERRAIN AVOIDANCE

This application is related to U.S. application Ser. No. 11/900,002 entitled "SYSTEM AND METHOD FOR A TERRAIN DATABASE AND/OR POSITION VALIDATION" by Woodell et al., and U.S. application Ser. No. 11/899,801 entitled "TERRAIN AVOIDANCE SYSTEM AND METHOD USING WEATHER RADAR FOR TERRAIN DATABASE GENERATION" by Woodell, both filed on an even date herewith and assigned to the Assignee of this patent application and incorporated herein by reference.

BACKGROUND

The present disclosure relates generally to the field of aviation. Specifically, the present disclosure relates to a terrain awareness system, such as a terrain awareness warning system ("TAWS").

Terrain awareness warning systems provide aircrews with information regarding the terrain. Standard TSO-C151b is utilized by the Federal Aviation Administration ("FAA") to specify four functions for a terrain awareness warning system. These functions are terrain display, premature descent alerting, ground proximity alerting and forward-looking terrain alerting. Terrain awareness warning systems that use databases are subject to three basic error conditions including position errors from the navigation system (e.g. the Global Positioning System ("GPS")), altitude or heading errors from the inertial sensors (e.g. the Altitude Heading Reference System ("AHRS")), and terrain elevation errors from the terrain database.

What is needed is a terrain awareness warning system configured to detect conflicts between the projected path of the aircraft and terrain that is immune to navigation errors, inertial sensor errors, and terrain elevation database errors; and to provide alerts to allow the aircrew to more effectively determine the appropriate course of action during an aircraft flight.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to terrain awareness system for use in an aircraft. The aircraft includes a radar system configured to transmit a first radio frequency signal and receive a second radio frequency signal and a display for receiving a display signal representative of a terrain. The terrain awareness warning system includes a forward-looking terrain device configured to be in communication with the radar system and to process a terrain signal from the radar system.

Another embodiment of the disclosure relates to a method for providing a terrain awareness warning system. The method includes receiving a terrain signal from a radar system and determining a terrain from the terrain signal. The method also includes generating an airplane to terrain comparison based on comparing a terrain profile with a flight path parameter.

Another embodiment of the disclosure relates to a terrain awareness warning system for use in an aircraft system including a radar system configured to transmit a first radio frequency wave and receive a second radio frequency wave and a display for receiving a display signal representative of a terrain. The terrain awareness warning system includes a means for providing forward-looking terrain alerts configured to be in communication with the radar system and to process a terrain signal from the radar system.

BRIEF DESCRIPTION OF THE DRAWINGS

The disclosure will become more fully understood from the following detailed description, taken in conjunction with the accompanying drawings.

FIG. 1 is an illustration of an aircraft control center or cockpit, according to one exemplary embodiment;

DETAILED DESCRIPTION OF THE EXEMPLARY EMBODIMENTS

Figure 2A:
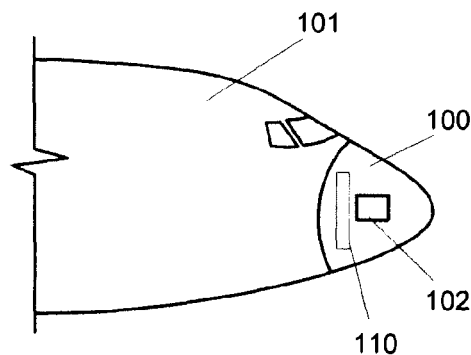
FIG. 2A is an illustration of an aircraft cone section, which includes the terrain awareness warning system, according to an exemplary embodiment.

Although the description below contains many specificities, these specificities are utilized to illustrate some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. A method or device does not have to address each and every problem to be encompassed by the present disclosure. All structural, chemical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

Referring to FIG. 1, an illustration of an aircraft control center or cockpit 10 is shown, according to one exemplary embodiment. Aircraft control center 10 may include a pilot seat 12a, a co-pilot seat 12b, an aircraft control stick 14, a plurality of flight controls 16 and flight displays 20. The pilot sitting in pilot seat 12a may utilize aircraft control stick 14 or other control devices to maneuver airplane 101. The pilot may initiate airplane 101 maneuvers including moving airplane 101 in an upwardly motion, downwardly motion, banking to the left, banking to the right or any combination thereof. The pilot can visually monitor the flight path through windshield 18. However, when the pilot utilizes windshield 18, his visual range is limited.

The crew utilizes flight displays 20 to increase their visual range and to enhance their decision-making abilities. In an exemplary embodiment, flight displays 20 may be configured to show weather, terrain (i.e., mountains or hills), fixed obstacles (i.e., towers), variable obstacles (i.e., other airplanes), flight characteristics (i.e., altitude or speed), or any combination thereof. Referring to FIG. 2A, an illustration of an aircraft cone section 100, which includes a terrain awareness warning system 110 and a radar system 102 is shown, according to an exemplary embodiment. In an exemplary embodiment, terrain awareness warning system 110 utilizes a broad band directional receiver and an active radar for detection of terrain or obstacle sources. In an exemplary embodiment, an active radar includes a transmitting device. It should be noted that the terrain and/or obstacle source can be any source detectable by terrain awareness warning system 110.

Figure 2B:
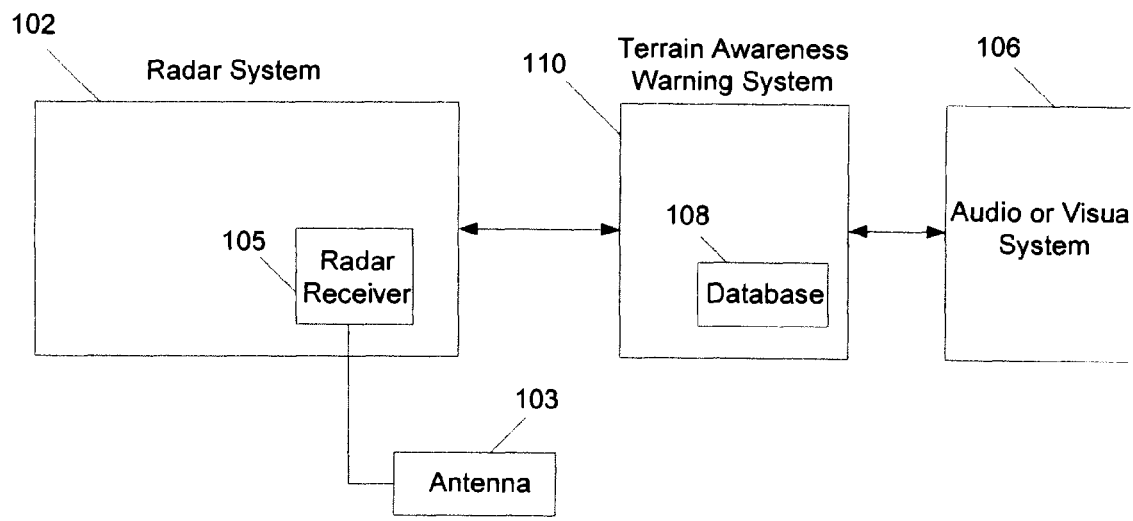
FIG. 2B is a block diagram of the terrain awareness warning system in communication with radar system and audio/visual system, according to an exemplary embodiment.

In FIG. 2B, is a block diagram of terrain awareness system, such as a terrain awareness warning system 110 in communication with radar system 102 and a display 106. In an exemplary embodiment, radar system 102 includes a radar receiver 105, which is in communication with an antenna 103. In an exemplary embodiment, radar receiver 105 is a transceiver. In an exemplary embodiment, radar system 102 is configured to include all the functionality of a WRT-4100 model. The WRT-4100 may be purchased from Rockwell Collins, Cedar Rapids, Iowa 52498. In another exemplary embodiment, radar system 102 includes any forward-looking radar system and is not limited to weather radars. In an exemplary embodiment, aircraft cone section 100 may also include equipment associated with a TAWS, GPWS, GCAS, WRT or any combination thereof. In an exemplary embodiment, terrain awareness warning system 110 includes a database 108. In an exemplary embodiment, display 106 can be an audio display, a visual display or both.

In an exemplary embodiment, terrain awareness warning system 110 may be utilized in combination with another terrain awareness warning system that employees a terrain database to communicate with aircrew that the aircraft's flight path may be on an imminent collision course with an obstacle. The terrain awareness warning system that employees a terrain database may include a Ground Proximity Warning System ("GPWS"), a Ground Collision Avoidance Systems ("GCAS"), a Terrain Awareness and Warning System or any combination thereof.

Figure 3:
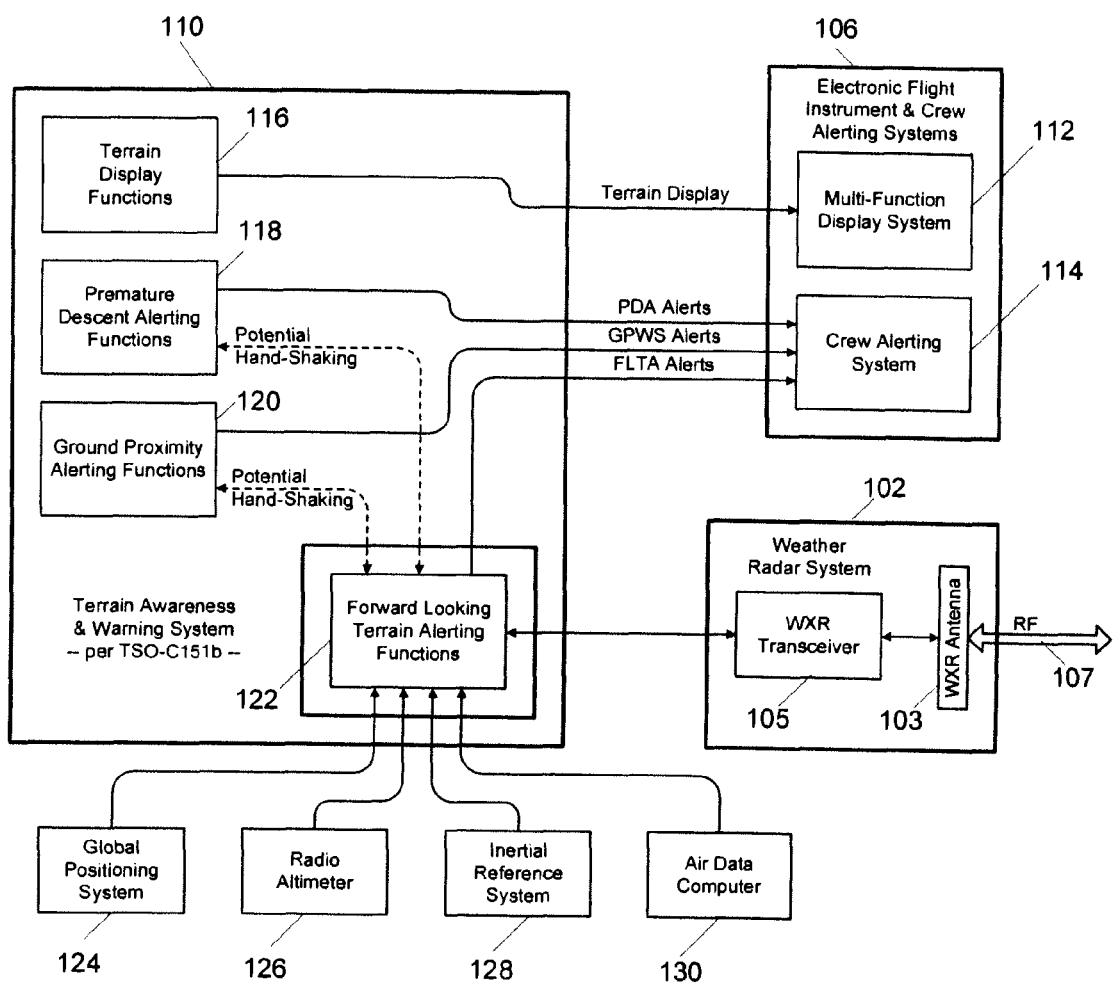
FIG. 3 is another block diagram of the terrain awareness warning system, according to an exemplary embodiment.

In FIG. 3, another block diagram of terrain awareness warning system 110 is shown, according to an exemplary embodiment. In an exemplary embodiment, terrain awareness warning system 110 includes a terrain display logic 116, a premature descent alerting logic 118, a ground proximity alerting logic 120 and a forward-looking terrain alerting logic 122. In an exemplary embodiment, radar system 102 looks ahead of the aircraft along the projected path of the aircraft. In an exemplary embodiment, radar system 102 transmits look ahead data to forward-looking terrain alerting logic 122. In an exemplary embodiment, terrain awareness warning system 110 computes range, elevation, and azimuth to terrain cells of interest along the projected path. Terrain awareness warning system 110 stores terrain data for the terrain cells that pass below the radar beam and which may eventually pass below the aircraft. In an exemplary embodiment, this terrain data may be stored in temporary memory and erased once the aircraft has passed over the terrain cell. In another exemplary embodiment, this terrain data may be stored in database 108. In this exemplary embodiment, this terrain data can be downloaded into a central off-board computer along with other terrain data from a plurality of aircrafts. This central off-board computer can upload a composite of terrain data obtained from the plurality of aircrafts to one of the aircraft, a few aircrafts, a plurality of aircrafts or all of the aircrafts. In an exemplary embodiment, terrain awareness warning system 110 can be configured to generate a discrepancy report comparing the terrain data uploaded from the central off-board computer to terrain data stored in database 108 or real-time terrain data generated by forward-looking terrain alerting logic 122.

In an exemplary embodiment, a terrain cell 205 (see FIGS. 4-8 and 10-14) can be located at or above the aircraft operating altitude. Terrain awareness warning system 110 utilizes forward-looking terrain alerting logic 122 to determine when the aircraft must initiate a climb to clear terrain cell 205. In another exemplary embodiment, terrain cell 205 can be located below the aircraft operating altitude. Terrain awareness warning system 110 monitors the inertial flight path of the aircraft and uses a downward-looking radio altimeter 126 to ensure that clearance parameters are maintained as the aircraft passes over terrain cell 205. In an exemplary embodiment, forward-looking terrain alerting logic 122 is in communication with downward-looking radio altimeter 126 to compare terrain data related to terrain cell 205 generated by both forward-looking terrain alerting logic 122 and downward-looking radio altimeter 126. This comparison is utilized to verify that the aircraft has passed over terrain cell 205 initially generated by forward-looking terrain alerting logic 122. It should be noted that one terrain cell 205, a few terrain cells 205 or a plurality of terrain cells 205 can make up a terrain profile.

In an exemplary embodiment, forward-looking terrain alerting logic 122 is in communication with radar system 102, downward-looking radar system 126, a global positioning system 124, an air data system 130, and an inertial reference system 128. In an exemplary embodiment, radar system 102 is a forward-looking radar system (i.e., a weather radar system). In an exemplary embodiment, downward-looking radar system 126 can be a radio altimeter ("RA"). In an exemplary embodiment, air data system can be an air data computer ("ADC"). In an exemplary embodiment, inertial reference system 128 can be an altitude heading reference system ("AHRS"). In an exemplary embodiment, the inertial altitude may be slaved to the barometric pressure altitude. In an exemplary embodiment, global positioning system 124 can be combined with inertial reference system 128 to enhance data calculations and support the display functionality. In an exemplary embodiment, terrain awareness warning system 110 may be configured to integrate the inertial and global positioning system data for computing alerts.

In an exemplary embodiment, terrain awareness warning system 110 may operate asynchronously. In this mode of operation, terrain awareness warning system 110 can be configured to utilize only terrain display logic 116. The terrain display provides strategic information so that the flight crew is aware of the terrain surrounding the aircraft. In other exemplary embodiments, terrain awareness warning system 110 can include at least one or all of premature descent alerting logic 118, ground proximity alerting logic 120 and forward-looking terrain alerting logic 122.

In an exemplary embodiment, premature descent alerting logic 118 can issue an alert during final approach when the aircraft is below a nominal three degree (3°) approach angle to the runway threshold. In another exemplary embodiment, premature descent alerting logic 118 can issue an alert during intermediate approach based on predetermined parameters.

In an exemplary embodiment, ground proximity alert logic 120 can issue an alert when the aircraft altitude and sink rate fall within the alerting envelopes specified by the GPWS minimum operational performance standards ("MOPS").

In an exemplary embodiment, forward-looking terrain alerting logic 122 can issue an alert when the projected path of the aircraft will break through the clearance altitudes defined in TSO-C151b. The TSO-C151b describes operating conditions that must result in a forward-looking alert. An alert must be issued when the aircraft is in level flight and below the terrain. This is known as the imminent terrain impact ("ITI") condition. An alert must be issued when a reduced required terrain clearance ("RTC") occurs. A reduced required terrain clearance occurs when either the aircraft is in level flight above the terrain but below the required clearance altitude or the aircraft is in descending flight above the terrain and descends below the clearance altitude. The TSO-C151b requires cautions and warnings alerts to be issued. In the imminent terrain impact condition, a caution and/or warning alert is issued when the flight crew can initiate a ¼ g vertical maneuver and can climb to the required clearance altitude above the terrain. In the descending flight, a caution and/or warning alert is issued when the flight crew can initiate a ¼ g vertical maneuver to level off at or above the required clearance altitude above the terrain.

Figure 4:
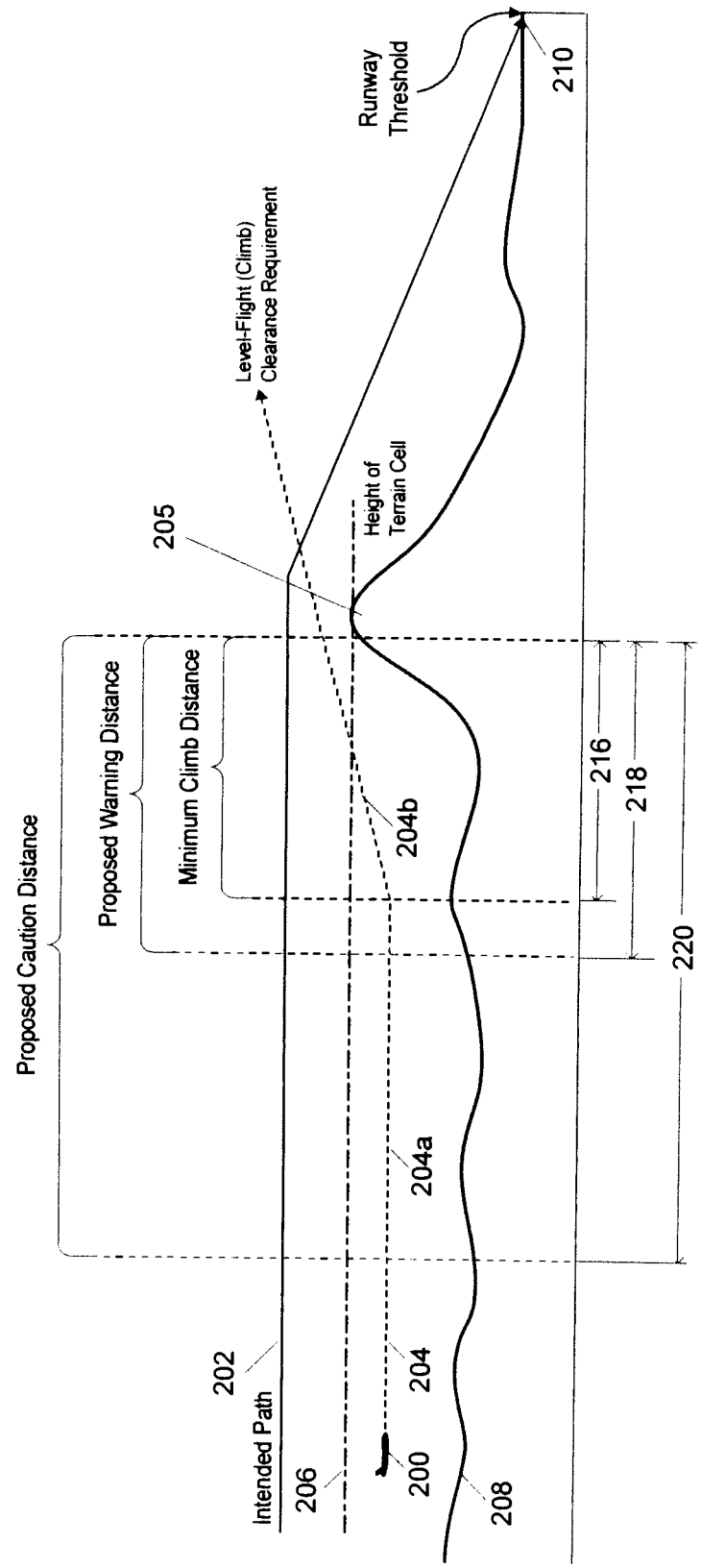
FIG. 4 is an illustration of the alerting distances for imminent terrain impact, according to an exemplary embodiment.

In FIG. 4, an illustration of the alerting distances for imminent terrain impact is shown, according to an exemplary embodiment. An airplane image 200 is on a level flight path 204 above a terrain 208. Level flight path 204 is at or below a terrain cell height 206. Level flight path 204 is also below an intend flight path 202. In an exemplary embodiment, intend flight path 202 complies with aviation minimum operational performance standards to allow airplane 101 to reach a runway threshold 210. In an exemplary embodiment, a caution signal and/or warning signal can be issued when airplane 101 reaches predetermined operational or system characteristics. In an exemplary embodiment, a caution signal would be issued when airplane 101 reaches a caution distance 220 from terrain cell 205. In an exemplary embodiment, a warning signal would be issued when airplane 101 reaches a warning distance 218 from terrain cell 205. In an exemplary embodiment, warning distance 218 is greater than or equal to a minimum climb distance 216.

Minimum climb distance 216 is the minimum distance required for airplane 101 to initiate a maneuver and be able to traverse terrain cell 205. Minimum climb distance 216 is the distance away from terrain cell 205 that allows airplane 101 to depart from level flight path 204 at end of a first portion of flight path 204a to a second portion of flight path 204b. In an exemplary embodiment, the minimum climb distance is the sum of two components. The first component is the distance covered by the aircraft during a ¼ g vertical maneuver to achieve a specified climb angle. The second component is the distance covered by the aircraft during the climb at the specified angle. In an exemplary embodiment, the specified climb angle is six degrees (6°) as defined in the Technical Standard Order ("TSO") for terrain awareness warning system 110. In an exemplary embodiment, the specified climb angle is computed in real time and is dependent on airplane 101 specific characteristics (i.e., size, weight, engine size, etc.).

TSO-C151b defines two types of alerts that must be issued to the flight crew to inform the crew that a potential conflict with terrain exists. Warnings indicate that a terrain conflict is imminent and that the crew must take immediate action to avoid an accident. Cautions indicate that a terrain conflict may be imminent and that the crew should prepare to take action to avoid an accident. The combination of warnings and cautions must occur in such a way as to ensure that the crew has sufficient time to react prior to the aircraft reaching minimum climb distance 216. In an exemplary embodiment, the warning alert can be issued before airplane 101 reaches minimum climb distance 216. In another exemplary embodiment, caution distance 220 can be up to twice the size of warning distance 218. In an exemplary embodiment, warning distance 218 and caution distance 220 can be tuned through lab simulations to minimize nuisance alerts.

Figure 5:
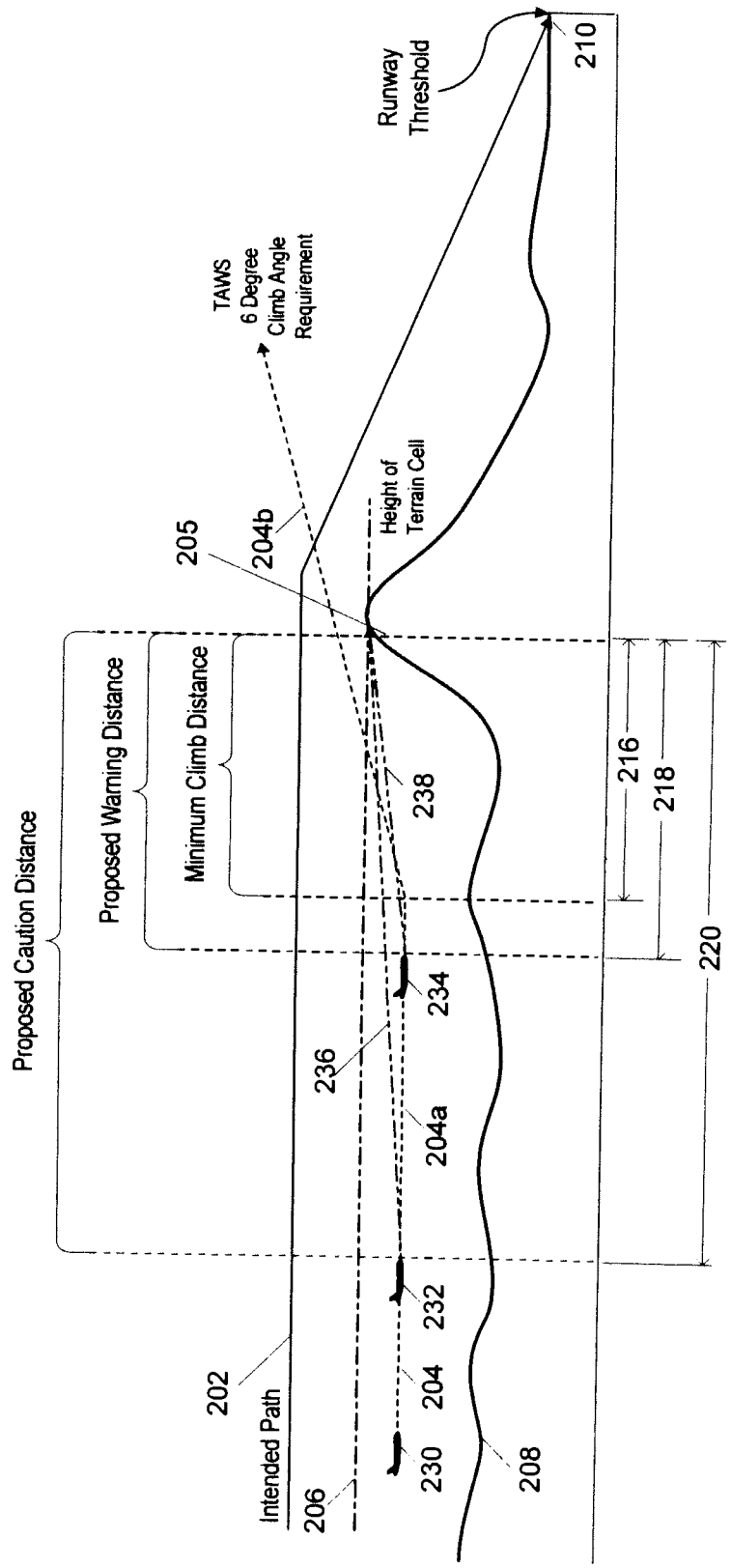
FIG. 5 is an illustration of the imminent terrain impact alerting targets, according to an exemplary embodiment.

In FIG. 5, an illustration of the imminent terrain impact alerting targets is shown, according to an exemplary embodiment. Airplane 101 is at a first position 230 on level flight path 204. In an exemplary embodiment, airplane 101 moves to a second position 232 on level flight path 204. At second position 232, airplane 101 enters caution distance 220 and terrain awareness warning system 110 determines that terrain cell 205 is one degree (1°) above airplane 101. In an exemplary embodiment, terrain awareness warning system 110 issues a caution signal. In this exemplary embodiment, terrain awareness warning system 110 utilizing radar system 102 to determine that a first received radio frequency wave 236 indicated that terrain cell 205 was one degree (1°) above airplane 101.

In an exemplary embodiment, airplane moves to a third position 234 on level flight path 204. At third position 234, airplane 101 enters warning distance 218 and terrain awareness warning system 110 determines that terrain cell 205 is two degrees (2°) above airplane 101. In an exemplary embodiment, terrain awareness warning system 110 issues a warning signal. In this exemplary embodiment, terrain awareness warning system 110 utilizing radar system 102 to determine that a second received radio frequency wave 238 indicated that terrain cell 205 was two degrees (2°) above airplane 101.

It should be noted that the selection of one degree (1°) and two degrees (2°) for caution and warning signals respectively can be any other combination of measurements and is not disclosed in a limiting fashion. It should also be noted that the selection can be customized for airplane system performance characteristics (i.e., size, weight, engine size, etc.).

In an exemplary embodiment, range and elevation targets for alerts can be computed in real-time and can be based on flight phase, aircraft altitude, airspeed, weight, flaps/slats configuration, air-brake configuration, outside air temperature and air pressure.

Figure 6:
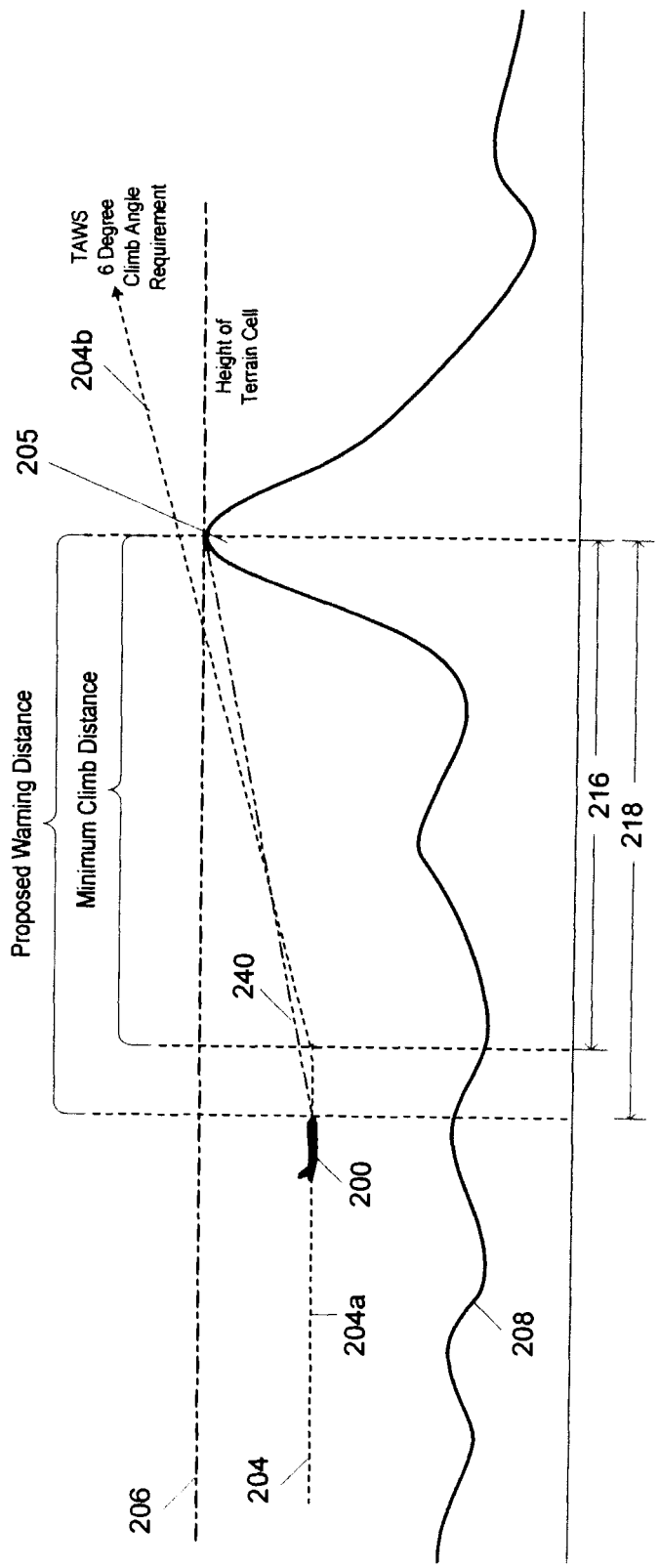
FIG. 6 is an illustration of a terrain profile with a single terrain cell, according to an exemplary embodiment.

In FIG. 6, an illustration of a terrain profile with a single terrain cell is shown, according to an exemplary embodiment. In this exemplary embodiment, airplane image 200 is on level flight path 204 above terrain 208. Airplane image 200 is entering warning distance 218, which is outside of minimum climb distance 216. In this exemplary embodiment, the cell of interest is the visible top of terrain cell 205, which is determined by line of sight. In an exemplary embodiment, a caution and/or warning signal is issued based upon the current performance capabilities of airplane 101 and the distance required to perform an evasive maneuver given those capabilities. In an exemplary embodiment, the evasive maneuver may not exceed ¼ g vertical acceleration. In an exemplary embodiment, the current performance capabilities are a static function based on initial system setup, maintenance reports, test flights, simulations, or any combination thereof. In another exemplary embodiment, the current performance capabilities are a dynamic function based on a system performance logic. The system performance logic receives sensor data from airplane 101 to determine the current performance capabilities of airplane 101. In exemplary embodiments, the system performance logic can be part of terrain awareness warning system 110 or a separate device that is capable of transmitting the current performance capabilities to terrain awareness warning system 110.

Figure 7:
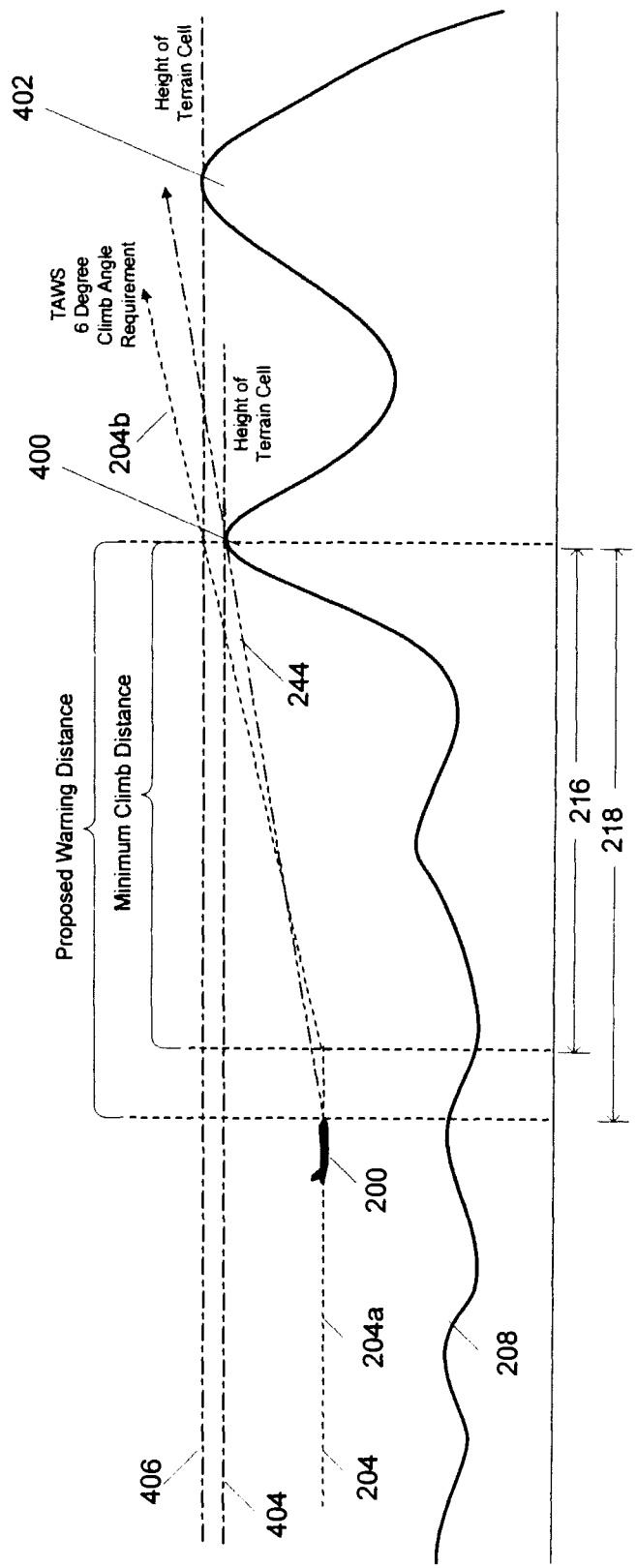
FIG. 7 is an illustration of a terrain profile with multiple terrain cells, according to an exemplary embodiment.

In FIG. 7, an illustration of a terrain profile with multiple terrain cells is shown, according to an exemplary embodiment. In this exemplary embodiment, airplane image 200 has entered warning distance 218. In this exemplary embodiment, the cell of interest is the highest terrain cell in the line of sight of airplane 101. In an exemplary embodiment, a first terrain cell 400 has a first terrain height 404 that is lower than a second terrain height 406 of second terrain cell 402. The cell of interest is first terrain cell 400 because second terrain cell 402 is not within the line of sight of airplane 101. In this exemplary embodiment, second terrain cell 402 is in the shadow of first terrain cell 400 closer to airplane 101. Second terrain height 406 is below a line of sight 244 of radar system 102 and may not require a caution and/or warning signal to be issued.

Figure 8:
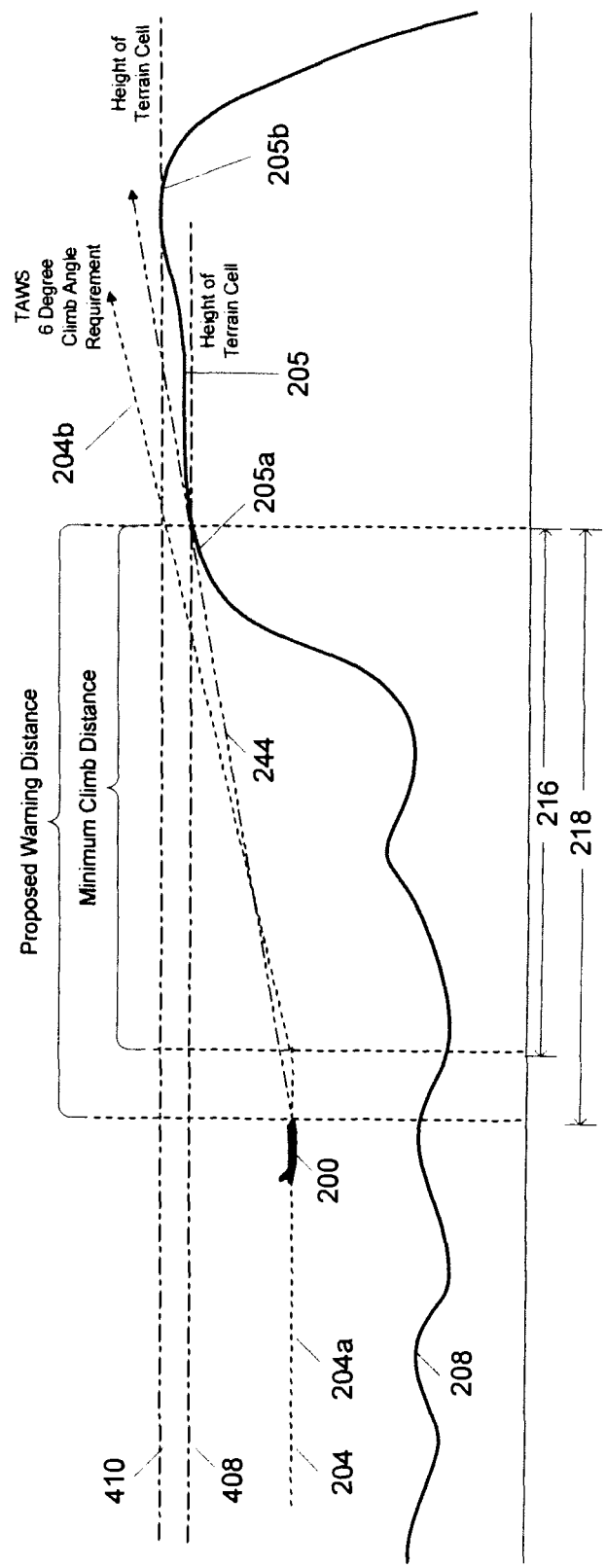
FIG. 8 is an illustration of a terrain profile with complex terrain features, according to an exemplary embodiment.

In FIG. 8, an illustration of a terrain profile with complex terrain features is shown, according to an exemplary embodiment. In an exemplary embodiment, airplane image 200 has entered warning distance 218. In this exemplary embodiment, the cell of interest is the highest terrain cell in the line of sight of airplane 101. In this exemplary embodiment, terrain cell 205 has a terrain cell lower portion 205a and a terrain cell higher portion 205b. Terrain cell lower portion 205a has a first terrain cell height 408 which is lower than a second terrain cell height 410 of terrain cell higher portion 205b. In an exemplary embodiment, the cell of interest is the highest point on terrain cell 205 in the line of sight of airplane 101. In this example, the highest point of terrain cell 205 which is terrain cell higher portion 205b is in the shadow of terrain cell lower portion 205a. Since terrain cell higher portion 205b is below line of sight 244 of radar system 102, terrain cell higher portion 205b is not the cell of interest.

Figure 9:
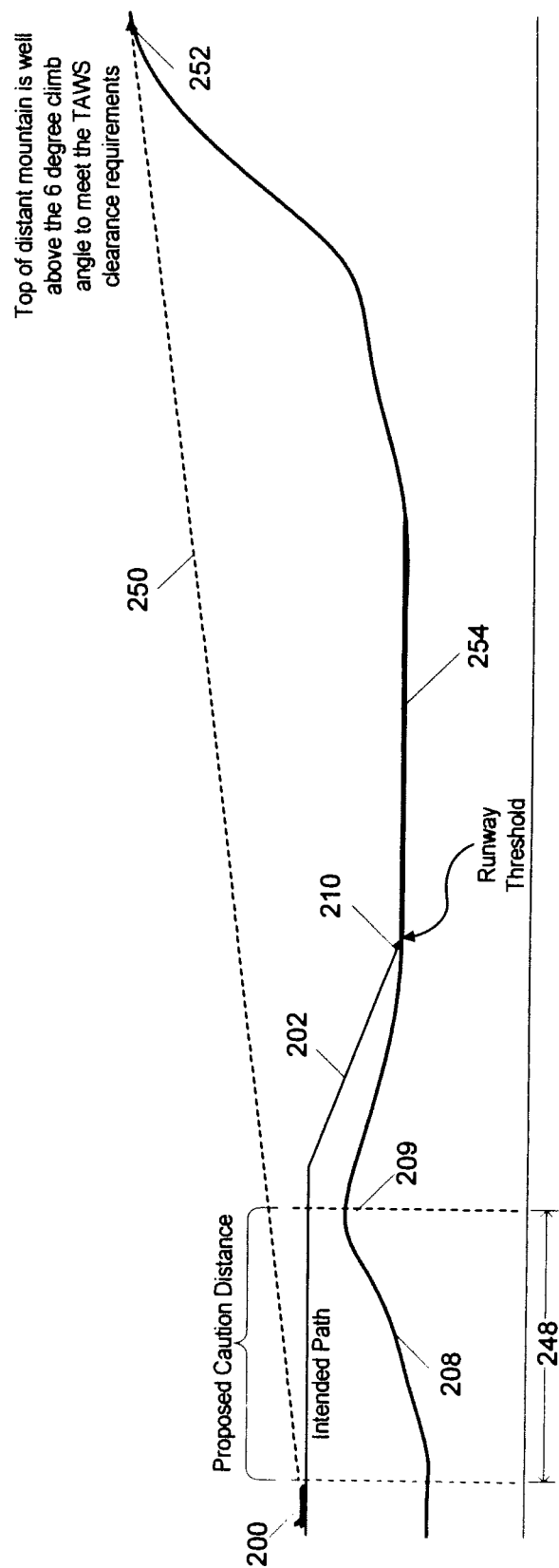
FIG. 9 is an illustration of utilizing range limits for terrain alerting during phase of flight, according to an exemplary embodiment.

In FIG. 9, an illustration of utilizing range limits for terrain alerting during phase of flight is shown, according to an exemplary embodiment. Airplane image 200 is on intended path 202 to arrive at runway threshold 210. Intended path 202 traverses terrain 208 which includes a terrain peak 209. In an exemplary embodiment, the look-ahead distance for computing cautions and/or warnings can be scaled appropriately for each phase of flight. In exemplary embodiments, the look-ahead distance can be shorter for the take-off phase and the landing phase as compared to level flight phase (i.e., enroute). In an exemplary embodiment, the look-ahead distance is shorter because airplane 101 flies towards a mountain on the other side of the airport during final approach or flies at a mountain for a short period of time during a circular approach. The shortened look-ahead distance during the landing phase can reduce nuisance alerts. In an exemplary embodiment, line of sight 250 from radar system 102 would issue a caution signal and/or warning signal based on line of sight 250 contacting a distant mountain 252. Distant mountain 252 may not be a hazard for airplane 101 arriving at a runway 254.

In an exemplary embodiment, terrain peak 209 can be a mountain that is five thousand (5,000) feet above airplane 101, which during enroute operations may require a warning signal to be issued when airplane 101 is up to twelve or thirteen (12 or 13) nautical miles from the mountain and a caution signal to be issued when airplane 101 is up to twenty (20) nautical miles from the mountain.

Figure 10:
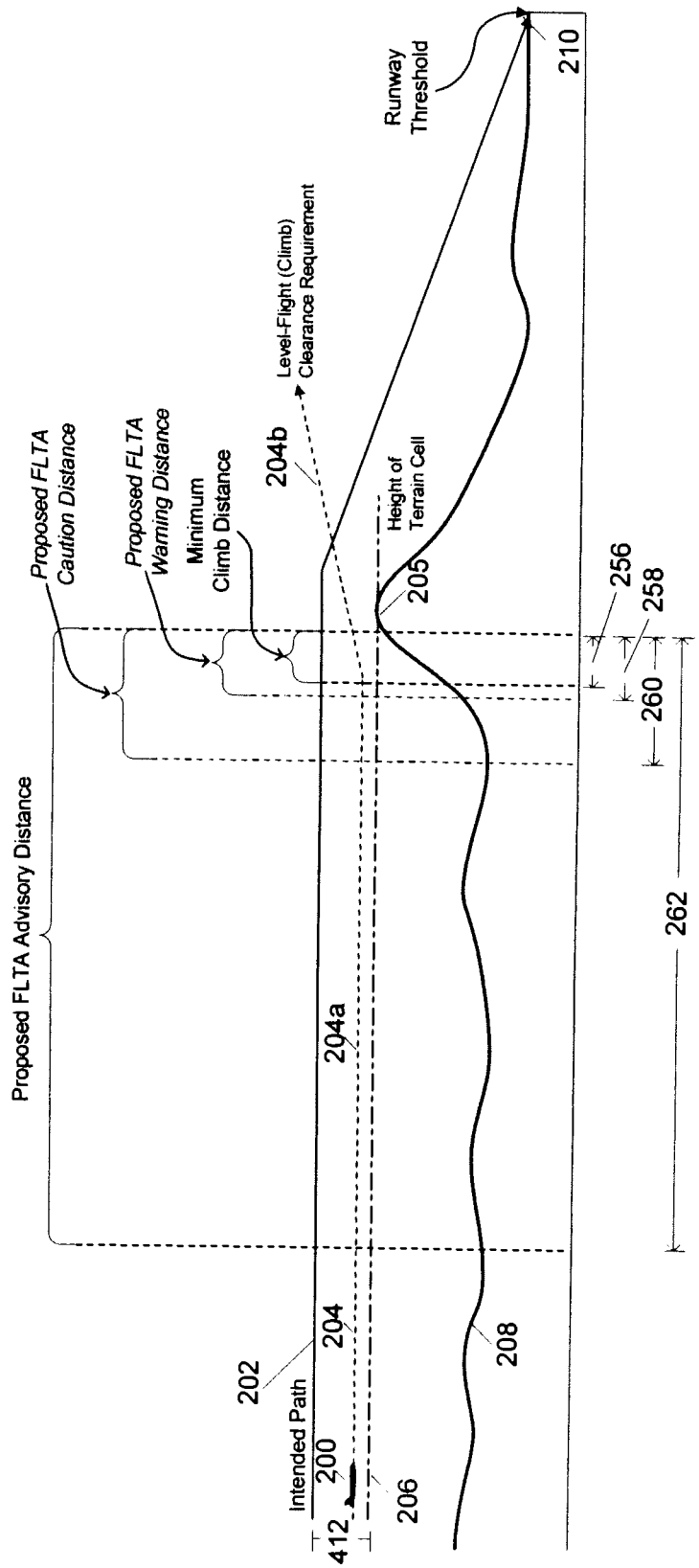
FIG. 10 is an illustration of providing alerts for required terrain clearance, according to an exemplary embodiment.

In FIG. 10, an illustration of providing alerts for required terrain clearance is shown, according to an exemplary embodiment. Airplane image 200 is flying above terrain 208 on level flight path 204. In an exemplary embodiment, radar system 102 transmits radio frequency waves that impact terrain cell 205 and are redirected back to radar system 102. The viewing angle from radar system 102 to terrain cell 205 is limited by physics. Since the viewing angle is limited by physics and can be narrow, it can be difficult to determine whether airplane 101 is slightly above or slightly below terrain cell 205. If airplane 101 is slightly below or slightly above terrain cell 205, terrain awareness warning system 110 can issue an alert at a maximum ITI warning distance 258 or a maximum ITI caution distance 260.

In another exemplary embodiment, if airplane 101 begins a descent before clearing terrain cell 205, terrain awareness warning system 110 switches from a reduced terrain clearance condition to an imminent terrain impact condition and appropriate alerts are transmitted. In this exemplary embodiment, an advisory alert can be issued outside of the TSO parameters. In this exemplary embodiment, the advisory distance for RTC can become maximum ITI caution distance 260.

In an exemplary embodiment, level flight path 204 is above terrain height 206 but below intended path 202. In an exemplary embodiment, intend flight path 202 complies with aviation minimum operational performance standards to allow airplane 101 to reach runway threshold 210. In an exemplary embodiment, a caution signal and/or warning signal can be issued when airplane 101 reaches predetermined operational or system characteristics.

The imminent terrain impact ("ITI") alerting distances can provide a guide for computing the required terrain clearance ("RTC") alerts. In an exemplary embodiment, the ITI alerting distances are determined in real-time based upon the difference between airplane's 101 altitude and the altitude of the visible top of terrain cell 205. In this exemplary embodiment, airplane 101 performance characteristics can be utilized in these real-time calculations. In an exemplary embodiment, maximum ITI caution distance 260 can be in the range of twenty (20) nautical miles during enroute operations. In an exemplary embodiment, maximum ITI caution distance 260 can be in the range of four (4) nautical miles during terminal area operations. In another exemplary embodiment, maximum ITI caution distance 260 can be in the range of two (2) nautical miles.

In an exemplary embodiment, maximum ITI warning distance 258 can be in the range of ten (10) nautical miles during enroute operations. In an exemplary embodiment, maximum ITI warning distance 258 can be two and one half (2½) nautical miles during terminal area operations. In another exemplary embodiment, maximum ITI warning distance 258 can be one and one half (1½) nautical miles during final approach operations. In an exemplary embodiment, the look-ahead distance for computing RTC alerts can be driven by maximum ITI caution distance 260 for each phase of flight.

In an exemplary embodiment, a RTC advisory distance 262 can be in the range of twenty (20) nautical miles during enroute operations.

Referring to FIG. 10, the TSO-C151b requires an alert when airplane 101 is above terrain cell 205 but below a required clearance altitude 412. In an exemplary embodiment, a second minimum climb distance 256 required to climb up to the clearance altitude is shorter than minimum climb distance 216 (see FIGS. 4-8). Since second minimum climb distance 256 is shorter than minimum climb distance 216, airplane 101 will be closer to the top of terrain cell 205 before a warning signal is transmitted requiring airplane 101 to climb up to clearance altitude 412.

In an exemplary embodiment, terrain awareness warning system 110 issues an advisory signal at the advisory distance when airplane 101 is above terrain cell 205 but below clearance altitude 412. In an exemplary embodiment, terrain awareness warning system 110 issues a caution at the caution distance when airplane is above terrain cell 205 but below clearance altitude 412. In an exemplary embodiment, terrain awareness warning system issues an a warning at the warning distance when airplane is above terrain cell 205 but below clearance altitude 412. In an exemplary embodiment, terrain awareness warning system 110 can issue a warning signal when airplane 101 initiates a descent before clearing terrain cell 205 when airplane 101 is above terrain cell 205 but below clearance altitude 412.

In an exemplary embodiment, terrain awareness warning system 110 can compute the maximum caution distance for the ITI condition for each phase of flight. In another exemplary embodiment, terrain awareness warning system 110 can look-up the maximum caution distance for the ITI condition for each phase of flight from a look-up table in a database.

Figure 11:
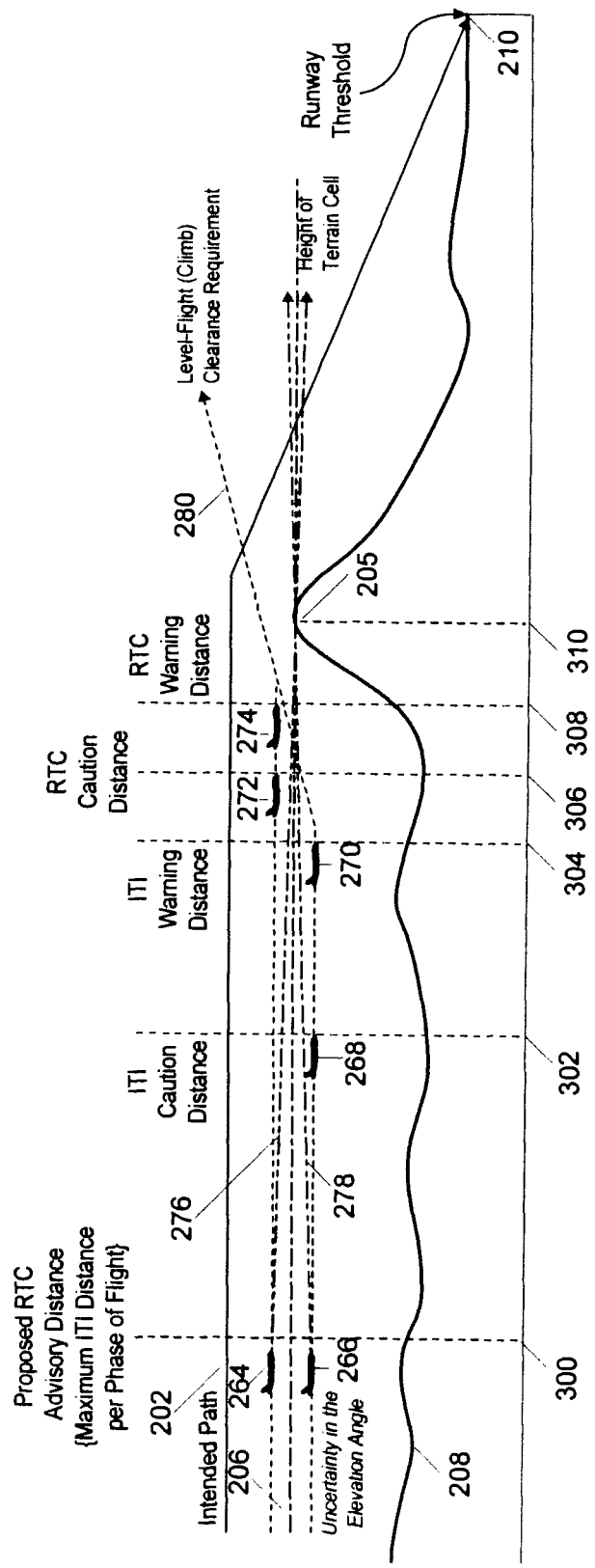
FIG. 11 is an illustration of combining required terrain clearance alerts and imminent terrain impact alerts, according to an exemplary embodiment.

In FIG. 11, an illustration of combining required terrain clearance alerts and imminent terrain impact alerts is shown, according to an exemplary embodiment. In an exemplary embodiment, airplane 101 can be at a RTC advisory distance 300 from a terrain cell position 310. In this exemplary embodiment, airplane 101 can be positioned at a first position above terrain cell 264 or airplane 101 can be positioned at a first position below terrain cell 266. The distance from airplane 101 to terrain cell 205 may narrow the viewing angle to terrain cell 205. For example, a line of sight from airplane above terrain cell 276 and a line of sight from airplane below terrain cell 278 can have a narrow viewing angle of terrain cell 205. In this exemplary embodiment, an advisory signal can be issued because of the narrower viewing angle.

In an exemplary embodiment, airplane 101 moves to a second position below terrain cell 268 at an ITI caution distance 302 from terrain cell position 310. At ITI caution distance 302, terrain awareness warning system 110 determines that airplane 101 is below terrain cell 205 and can issue a caution signal. In an exemplary embodiment, the farther airplane 101 is below terrain cell 205 the sooner a caution signal is issued.

In an exemplary embodiment, airplane 101 moves to a third position below terrain cell 270 at an ITI warning distance 304 from terrain cell position 310. At ITI warning distance 304, terrain awareness warning system 110 determines that airplane 101 is still below terrain cell 205 and issues a warning signal for airplane 101 to maneuver on a level-flight clearance path 280.

In an exemplary embodiment, airplane 101 moves to a second position above terrain cell 272 at a RTC caution distance 306 from terrain cell position 310. At RTC caution distance 306, terrain awareness warning system 110 determines that airplane 101 is not at the required altitude and issues a caution signal to the aircrew.

In an exemplary embodiment, airplane moves to a third position above terrain cell 274 at a RTC warning distance 308 from terrain cell position 310. At RTC warning distance 308, terrain awareness warning system 110 determines that airplane 101 is still not at the required altitude and issues a warning signal for airplane to maneuver on level-flight clearance path 280.

In an exemplary embodiment, terrain awareness warning system 110 can determine the elevation angle to the visible top of terrain cell 205 at the maximum ITI caution distance. In an exemplary embodiment, an RTC advisory can be issued if the elevation angle is between one degree (1°) below airplane 101 to one degree (1°) above airplane 101. In another exemplary embodiment, as airplane 101 proceeds in airplane's 101 flight plan, an ITI caution signal can be issued if the visible top of terrain cell 205 climbs to one degree (1°) above airplane 101 or an ITI warning signal can be issued if the visible top of terrain cell 205 climbs to two degrees (2°) above airplane 101. In an exemplary embodiment, a RTC caution can be issued if terrain cell 205 does not fall more than two degrees (2°) below airplane 101 by a predetermined distance (i.e., 1, 2, 3, 4, 5 or 10 nautical miles). In an exemplary embodiment, the distance can be flight phase and/or ground speed dependent. In an exemplary embodiment, a RTC warning can be issued if terrain cell 205 does not fall more than four degrees (4°) below airplane 101 by a predetermined distance (i.e., 1, 2, 3, 4, 5 or 10 nautical miles). In an exemplary embodiment, the RTC caution and warning distances are computed in real-time based upon geometry driven by the TAWS clearance angle for each phase of flight. In an exemplary embodiment, the computed distances will be one half (½) and one quarter (¼) the maximum ITI warning distance.

Figure 12:
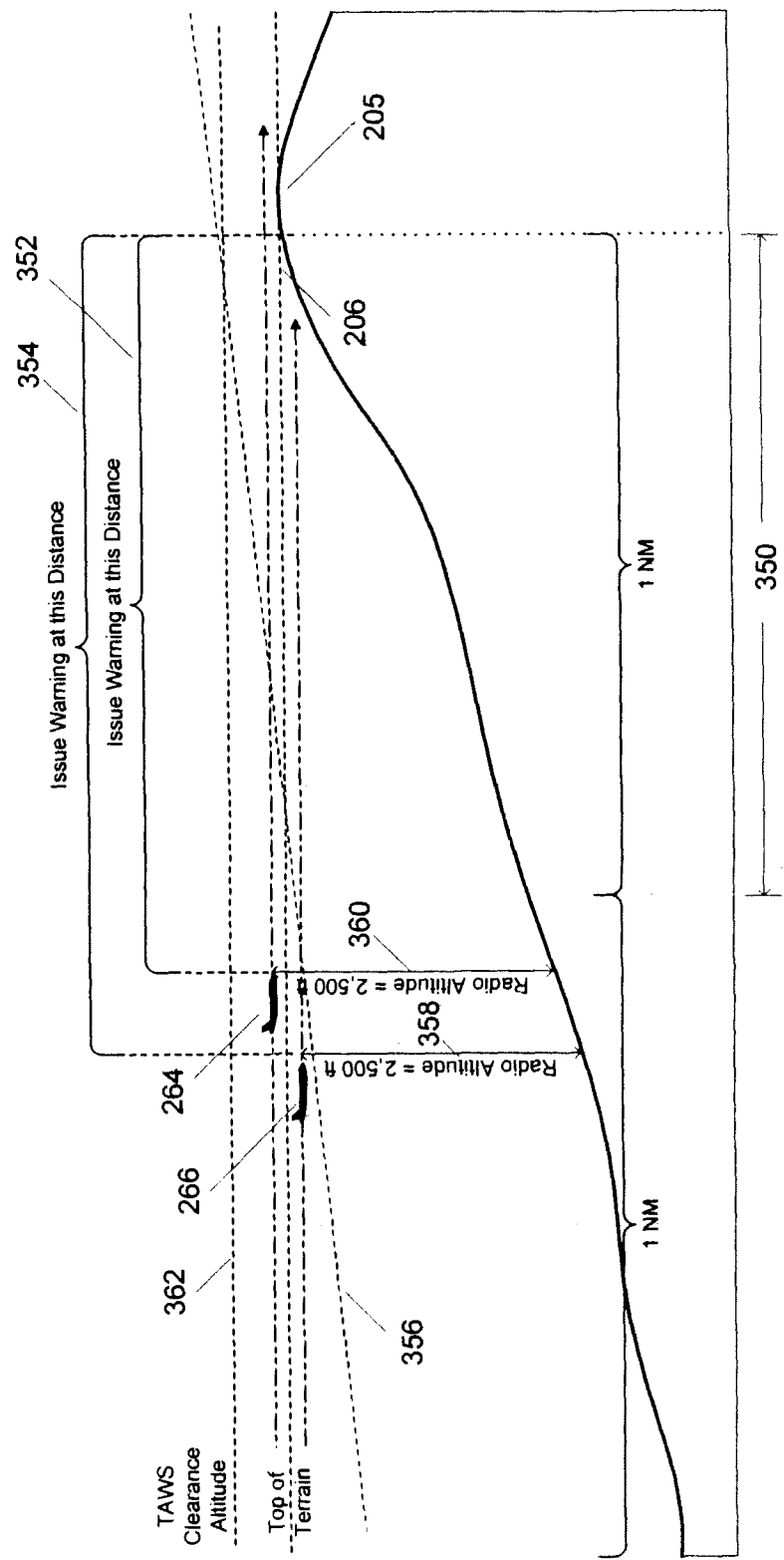
FIG. 12 is another illustration of combining required terrain clearance alerts and imminent terrain impacts alerts, according to an exemplary embodiment.

In FIG. 12, an illustration of combining required terrain clearance alerts and imminent terrain impacts alerts is shown, according to an exemplary embodiment. In this exemplary embodiment, airplane 101 can be positioned at first position above terrain cell 264 or airplane 101 can be positioned at first position below terrain cell 266. The distance from airplane 101 to terrain cell 205 may narrow the viewing angle to terrain cell 205. For example, a line of sight from airplane above terrain cell 276 and a line of sight from airplane below terrain cell 278 can have a narrow viewing angle of terrain cell 205.

In an exemplary embodiment, terrain awareness warning system 110 can monitor an elevation angle 356. If airplane 101 is at first position below terrain cell 266 and continues on this flight path, then elevation angle 356 steadily increases (i.e. positive rate of change) until terrain awareness warning system 110 issues an ITI caution or warning depending on a predetermined elevation angle 356. In another exemplary embodiment, terrain awareness warning system 110 issues an ITI caution or warning depending on at least one of a predetermined elevation angle 356, a distance to terrain cell 205, terrain cell height 206, a TAWS clearance altitude 362, an airplane altitude or any combination thereof.

In an exemplary embodiment, if airplane 101 is at first position above terrain cell 264 and continues on this flight path, elevation angle (not shown) should steadily decrease (i.e. negative rate of change). In an exemplary embodiment, terrain awareness warning system 110 can generate a RTC caution and warning alerts if the elevation angle does not decrease by an threshold amount in a predetermined time. In this exemplary embodiment, airplane 101 is above terrain cell 205 but airplane 101 is under TAWS clearance altitude 362.

In an exemplary embodiment, airplane 101 can be at the same altitude as terrain cell 205. In this exemplary embodiment, elevation angle (not shown) can stay steady or alternate between positive and negative. In this exemplary embodiment, an alert can be issued based on the distance to terrain cell 205. In an exemplary embodiment, the distance to terrain cell 205 is less then two (2) nautical miles.

In an exemplary embodiment, terrain awareness warning system 110 can monitor the altitude of airplane 101 utilizing radio altimeter 126. In an exemplary embodiment, terrain awareness warning system 110 will issue a warning when airplane 101 at first position below terrain cell 266 has an altitude of two thousand five hundred (2,500) feet and/or is at a minimum warning distance 350. In an exemplary embodiment, minimum warning distance 350 is one (1) nautical mile. In an exemplary embodiment, terrain awareness warning system 110 will issue a warning when airplane 101 at first position above terrain cell 264 has an altitude of two thousand five hundred feet (2,500) and/or is at minimum warning distance 350.

Airplane 101 at an aircraft below terrain cell warning distance 354 and an aircraft above terrain cell warning distance 352 both trigger alerts when airplane's 101 altitude is two thousand five hundred (2,500) feet. It should be noted that any altitude can be used to trigger the alerts.

Figure 13:
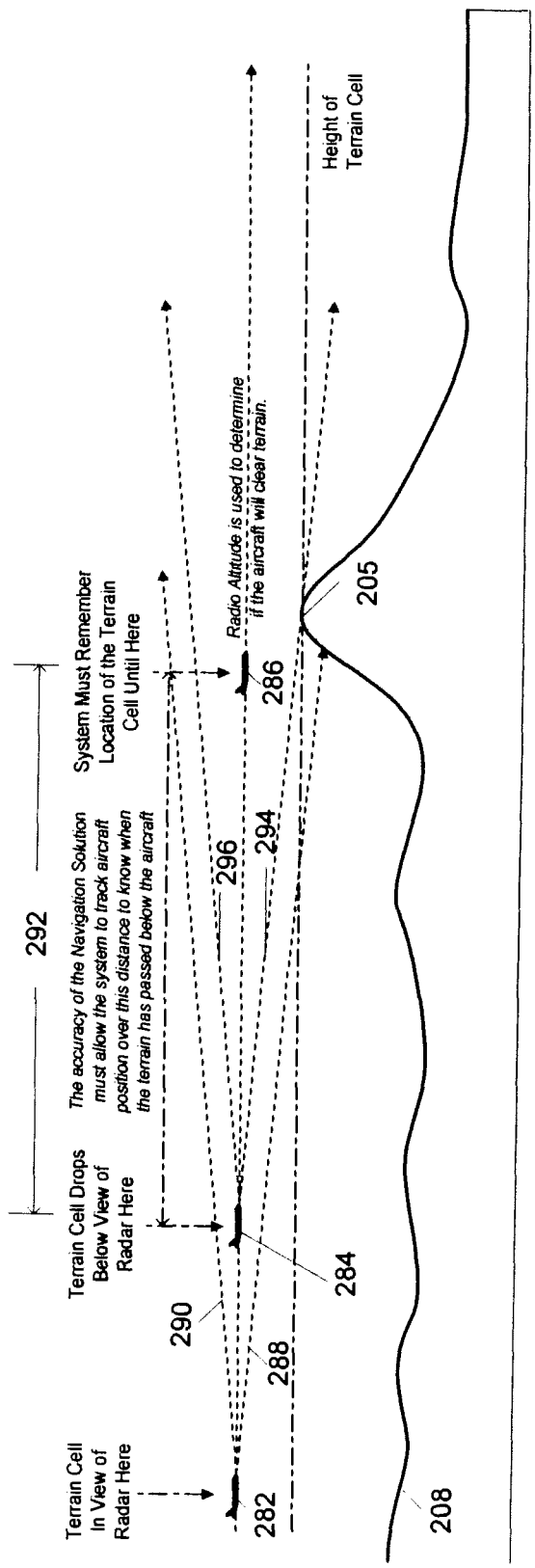
FIG. 13 is an illustration of terrain alerting when operating above the terrain; according to an exemplary embodiment.

In FIG. 13, an illustration of terrain alerting when operating above the terrain is shown, according to an exemplary embodiment. In an exemplary embodiment, airplane 101 is at a terrain cell in view position 282. At this terrain cell in view position 282, radar system 102 transmits radio frequency waves that have a first upper range 290 and a first lower range 288. In this exemplary embodiment, terrain cell 205 is within first lower range 288 and first upper range 290, which enables radar system 102 to detect terrain cell 205.

In an exemplary embodiment, airplane 101 moves to a first obscured terrain cell position 284. At this first obscured terrain cell position 284, radar system 102 transmits radio frequency waves that have a second upper range 296 and a second lower range 294. In this exemplary embodiment, terrain cell 205 is outside of second lower range 294 and second upper range 296, which entails that the navigation be configured to track airplane's 101 position over a terrain obscured distance 292. In an exemplary embodiment, airplane 101 moves to a second obscured terrain cell position 286. At second obscured terrain cell position 286, terrain awareness warning system 110 can be configured to erase the data associated with terrain cell 205 to conserve memory. In an exemplary embodiment, terrain awareness warning system 110 stores the data associated with terrain cell 205 to build a database of all terrain cells 205 that radar system 102 detects during airplane 101 flight. In an exemplary embodiment, radio altimeter 126 can be utilized to verify that airplane 101 has the appropriate clearance altitude.

In an exemplary embodiment, any terrain cell that is lower than airplane 101 will drop below the visibility of radar system 102. The higher airplane 101 is above terrain cell 205, the sooner terrain cell 205 will drop below radar system 102 ability to detect terrain cell 205. In an exemplary embodiment, terrain awareness warning system 110 stores the location of terrain cell 205 in memory before terrain cell 205 drops out of radar visibility. In an exemplary embodiment, dead-reckoning can be used to determine when airplane 101 passes over terrain cell 205. In another exemplary embodiment, integrating GPS data can improve navigational accuracy.

In an exemplary embodiment, forward-looking terrain logic 122 computes the range, azimuth, and elevation to terrain cell 205 relative to the longitudinal body axis of airplane 101. In an exemplary embodiment, the range, azimuth, and elevation of terrain cell 205 is converted into a local x, y, z coordinate system relative to the center of gravity of airplane 101. In an exemplary embodiment, inertial reference system 128 inputs can be used to compute airplane 101 path relative to terrain cell 205 in this local x, y, z coordinate system. In an exemplary embodiment, terrain awareness warning system 110 tracks the location relative to airplane 101 center of gravity and flight path until terrain cell 205 has passed behind airplane 101 and is no longer a potential obstacle to airplane 101. In another exemplary embodiment, dead-reckoning data inputs are utilized to provide terrain awareness warning system 110 data for the distances involved from the time terrain cell 205 falls below radar system 102 view until the time airplane 101 passes over terrain cell 205. In an exemplary embodiment, terrain awareness warning system 110 is a self-contained solution using radar system 102, radio altimeter 126 and inertial reference system 128 to compute caution and warning signals for terrain cell 205 avoidance.

In an exemplary embodiment, the availability of global positioning system 124 can enable the position of terrain cell 205 to be mapped from the local x, y, z coordinate system to an earth-reference (latitude, longitude, altitude) coordinate system. In this exemplary embodiment, terrain awareness warning system 110 can correlate the terrain awareness warning system alerting function and the terrain awareness warning system display function so that the display function can indicate which terrain cell 205 feature has triggered the radar-based TAWS alert. In another exemplary embodiment, the GPS position can be integrated with the inertial dead-reckoning solution to determine when airplane 101 has passed over terrain cell 205.

Figure 14:
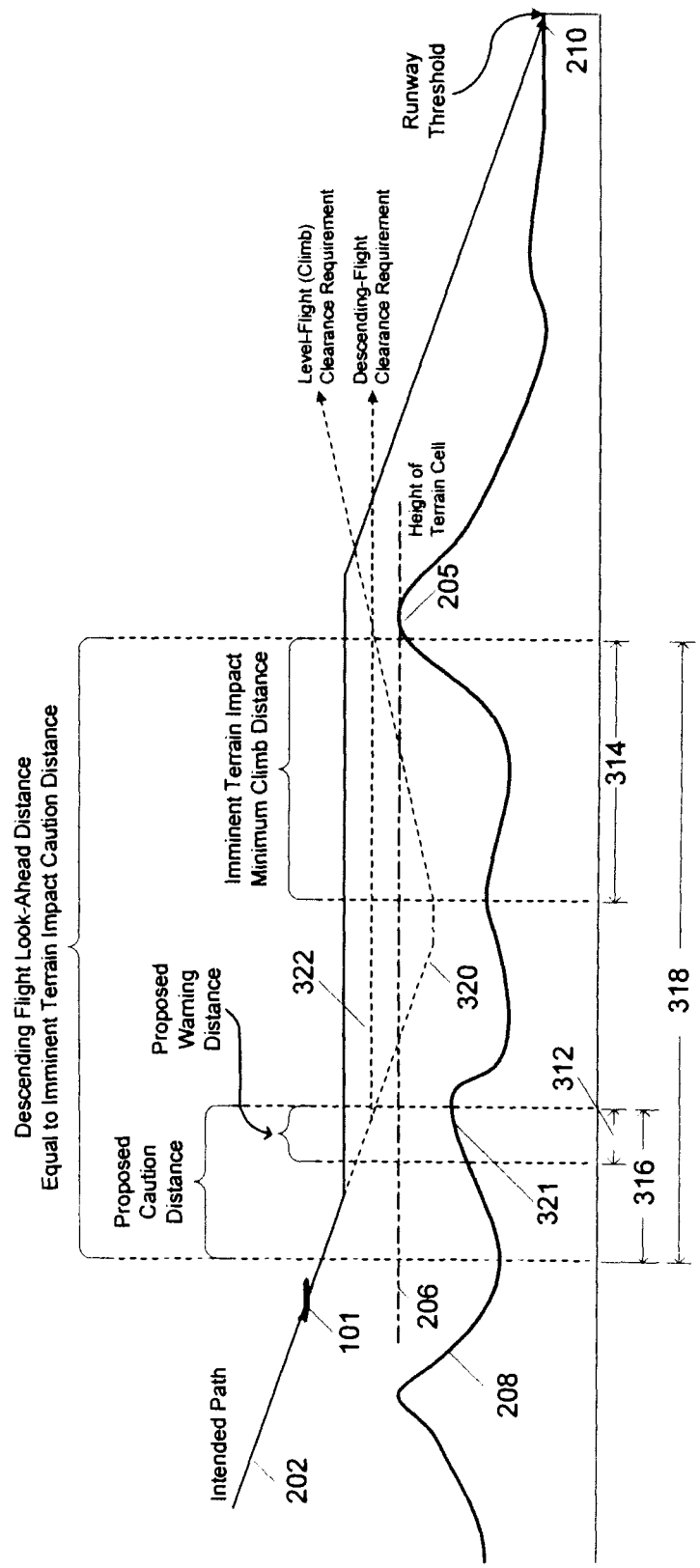
FIG. 14 is an illustration of required terrain clearance in a descending flight, according to an exemplary embodiment.

In FIG. 14, an illustration of required terrain clearance in descending flight is shown, according to an exemplary embodiment. In an exemplary embodiment, airplane 101 is on intended path 202 to arrive at runway threshold 210 to land on runway 254 (see FIG. 9). In an exemplary embodiment, airplane 101 leaves intended path 202 and enters a warning path 320. At a warning distance 312, terrain awareness warning system 110 initiates a warning signal to the aircrew. In exemplary embodiments, the warning signal is triggered by the distance from airplane 101 to a descending-flight clearance requirement 322, a distance from a closest terrain cell 321, terrain cell height 206 or any combination thereof.

In an exemplary embodiment, when airplane 101 enters a caution distance 316, terrain awareness warning system 110 initiates a caution signal. In an exemplary embodiment, the starting point of caution distance 316 equals a descending flight look-ahead distance equal to imminent terrain impact caution distance 318 from terrain cell 205. In an exemplary embodiment, when airplane 101 enters a imminent terrain impact minimum climb distance 314, terrain awareness warning system 110 initiates another warning to take immediate evasive maneuvers.

In an exemplary embodiment, the RTC caution and warning distances are driven by the time required to level-off above descending-flight clearance requirement 322. In an exemplary embodiment, these RTC caution and warning distances are shorter than the distances required to climb over terrain cell 205 in the imminent impact condition. Terrain awareness warning system 110 can look far enough ahead of airplane's 101 position to avoid the imminent terrain impact condition when the airplane 101 descends too far.

In an exemplary embodiment, forward-looking terrain alerting logic 122 can compute the range, azimuth, and elevation to terrain cell 205 relative to the nose and longitudinal body axis of airplane 101. In an exemplary embodiment, the height of the terrain cell of interest can be measured in terms of feet below airplane's 101 center of gravity (i.e., negative relative altitude). In this exemplary embodiment, the height of the terrain cell 205 becomes the operational floor for airplane 101.

In another exemplary embodiment, terrain awareness warning system 110 can integrate the inertial descent rate (i.e., negative altitude rate) to determine when airplane 101 is approaching the operational floor. Terrain awareness warning system 110 can utilize inertial reference system 128 (see FIG. 3) with input from barometric altitude and/or a GPS position and altitude can be utilized. In an exemplary embodiment, terrain cell height 206 can be mapped from terrain cell's 205 position below airplane's 101 center of gravity to an earth-reference altitude. In this exemplary embodiment, airplane's 101 GPS altitude can be used to determine when airplane 101 is approaching the operational floor.

In an exemplary embodiment, nuisance alerts can be suppressed in terrain awareness warning system 110. In an exemplary embodiment, airplane 101 is departing airport. In this exemplary embodiment, an alert may not be issued when the flight path angle is greater than the line-of-sight angle to terrain cell 205. In this exemplary embodiment, an immediate alert may be issued if airplane 101 levels-off before adequate clearance of terrain cell 205 is achieved.

In another exemplary embodiment, an alert may not be issued when the heading rate or track-angle rate is sufficient to ensure airplane 101 will turn before conflict with terrain cell 205 is imminent. In this exemplary embodiment, an immediate alert may be issued if airplane 101 levels-out before adequate clearance of terrain cell 205 is achieved. In an exemplary embodiment, an alert may be required if the change in heading or track angle brings a new terrain cell into line-of-sight during the turn. In this exemplary embodiment, terrain awareness warning system 110 can look-ahead (i.e., left or right as appropriate) during a turn to see if a conflict with terrain is imminent. In an exemplary embodiment, the turn radius of airplane 101 can be derived directly from inertial lateral acceleration data.

Figure 15:
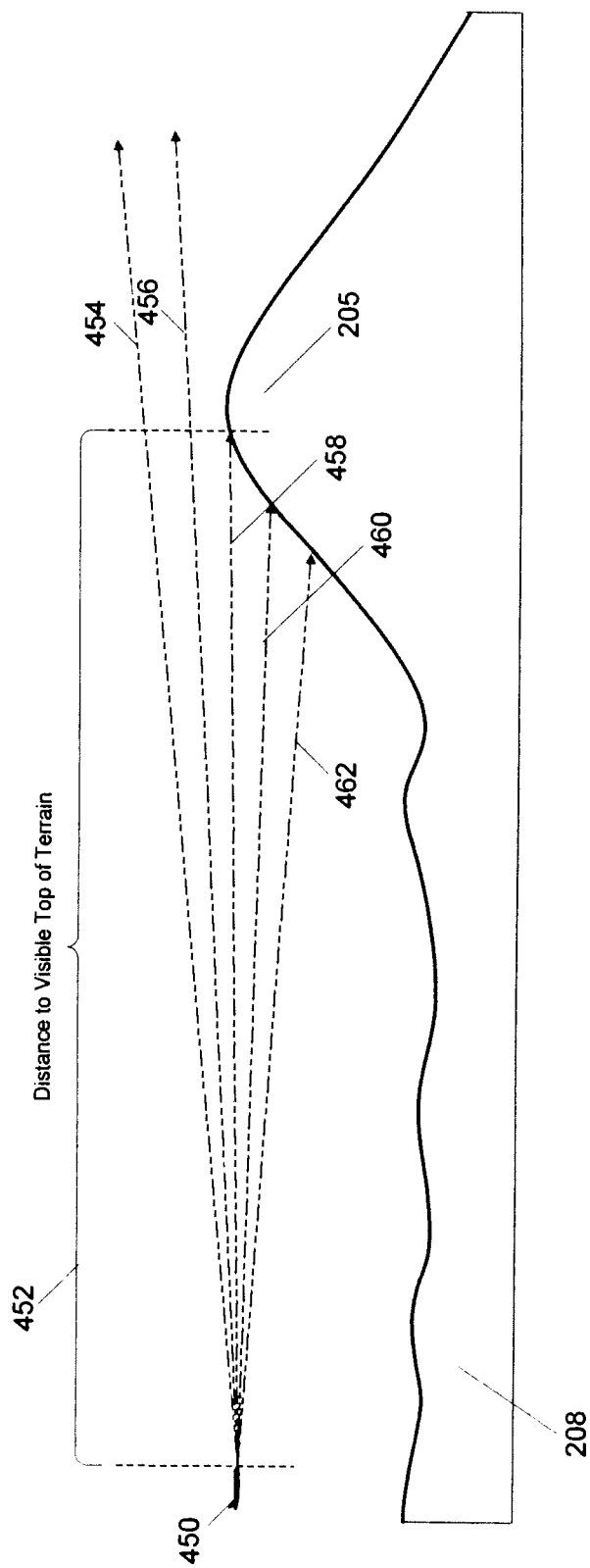
FIG. 15 is an illustration of utilizing a forward-looking radar system to detect terrain cells of interest, according to an exemplary embodiment.

In FIG. 15, an illustration of utilizing a forward-looking radar system to detect terrain cells of interest is shown, according to an exemplary embodiment. In an exemplary embodiment, airplane 101 is over terrain 208 and is at a distance to visible top of terrain 452 from terrain cell 205. In an exemplary embodiment, radar system 102 defines the search volume by the radar sweep pattern used to search for terrain cell 205. The forward-looking system determines the position (i.e., range, azimuth, and elevation) of terrain cell 205 relative to the body axis of airplane 101. In an exemplary embodiment, radar system 102 transmits a first signal 454, a second signal 456, a third signal 458, a fourth signal 460, and a fifth signal 462. Distance to visible top of terrain 452 is determined from fundamental radar technology (i.e., the time lag from transmission of a signal to the return of the signal directly correlates to the distance to terrain cell 205). In an exemplary embodiment, height of terrain cell 206 (see FIGS. 4-8 and 10-14) is determined from discontinuities in the range estimate to terrain cell 205. In this exemplary embodiment, third signal 458, fourth signal 460, and fifth signal 462 indicate that terrain cell 205 is approximately eight (8) miles away. In this exemplary embodiment, first signal 454 and second signal 456 indicate that terrain is ten (10) miles away. In this exemplary embodiment, terrain awareness warning system 110 would determine height of terrain cell 206 based on third signal 458. In should be noted that the distances utilized by terrain awareness warning system 110 can be any distance that the forward-looking radar system is capable of determining an obstacle source.

Figure 16:
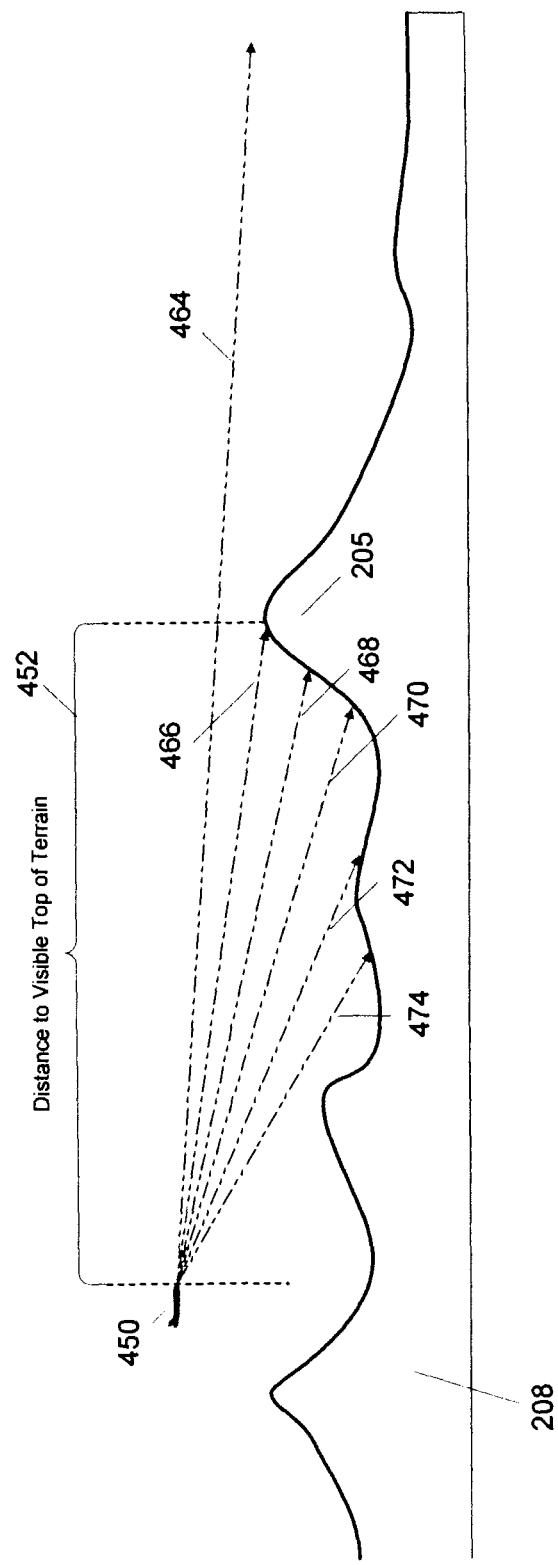
FIG. 16 is another illustration of utilizing a forward-looking radar system to detect terrain cells of interest, according to an exemplary embodiment.

In FIG. 16, an illustration of utilizing a forward-looking radar system to detect terrain cells of interest is shown, according to an exemplary embodiment. In an exemplary embodiment, airplane 101 is over terrain 208 and is at a distance to visible top of terrain 452 from terrain cell 205. In an exemplary embodiment, radar system 102 defines the search volume by the radar sweep pattern used to search for terrain cell 205. The forward-looking system determines the position (i.e., range, azimuth, and elevation) of terrain cell 205 relative to the body axis of airplane 101. In an exemplary embodiment, radar system 102 transmits a sixth signal 464, a seventh signal 466, an eighth signal 468, a ninth signal 470, a tenth signal 472, and an eleventh signal 474. In an exemplary embodiment, radar system 102 determines height of terrain cell 206 by the discontinuities in the range estimate to terrain cell 205 (see FIG. 15). In this exemplary embodiment, sixth signal 464 would indicate a different distance to terrain cell 205 then seventh signal 466, eighth signal 468, ninth signal 470, tenth signal 472, and eleventh signal 474. In this exemplary embodiment, terrain awareness warning system 110 would utilize seventh signal 466 to determine height of terrain cell 206.

In an exemplary embodiment, terrain awareness warning system 110 can measure the slope of terrain cell 205. In this exemplary embodiment, height of terrain cell 206 can be determined from the change of slope from positive (i.e., ascending terrain) to negative (i.e., descending terrain). In an exemplary embodiment, tenth signal 472 and eleventh signal 472 indicate a relatively level terrain 208. In this exemplary embodiment, ninth signal 470, eighth signal 468, and seventh signal 466 indicate an ascending terrain because of the positive change in slope. In this exemplary embodiment, terrain awareness warning system 110 can determine height of terrain cell 206 because the change in slope would turn negative after seventh signal 466. In an exemplary embodiment, radar system 102 can sweep below the flight path angle upwards towards the horizon until the appropriate look-ahead distance is achieved.

It should be noted that radar system 102 can be any forward-looking radar system. It should also be noted that radar system 102 can scan the horizon searching for terrain cell 205 with horizontal sweeps (i.e., left to right), vertical sweeps (i.e., up and down), or any combination of horizontal sweeps and vertical sweeps to illuminate terrain cell 205.

Figure 17:
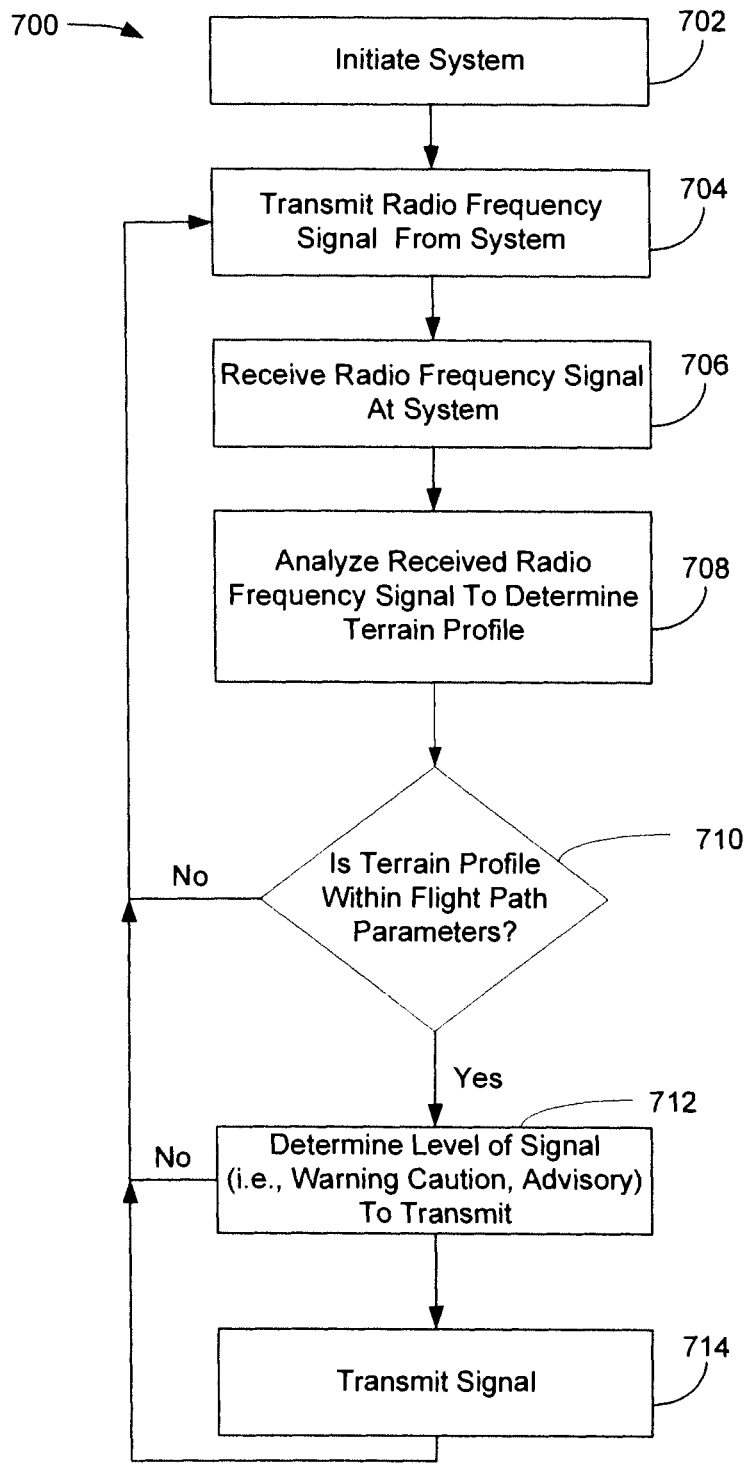
FIG. 17 is a flowchart of an operating procedure of the system, according to an exemplary embodiment.

In FIG. 17, a flowchart of an operating procedure of the system is shown, according to an exemplary embodiment. Terrain awareness warning system 110 is initiated (step 702). Terrain awareness warning system 110 transmits radio frequency waves (step 704). Terrain awareness warning system 110 receives radio frequency waves (step 706). Terrain awareness warning system 110 analyzes received radio frequency waves to determine terrain profile (step 708). Terrain awareness warning system 110 determines whether terrain profile is within flight parameters (step 710). If terrain profile is outside of flight parameters, then terrain awareness warning system 110 returns to step 704 (step 710). If terrain profile is within flight parameters, then terrain awareness warning system 110 moves to step 712 (step 710). Terrain awareness warning system 110 determines whether to issue a warning signal, a caution signal and/or an advisory signal (step 712). Terrain awareness warning system 110 transmits at least one signal determined in step 712 and returns to step 704 (step 714).

Figure 18A:
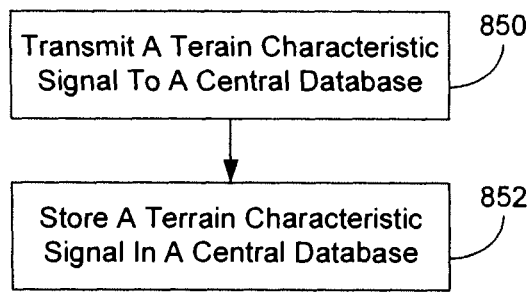
FIGS. 18A and 18B are flowcharts of other operating procedures of the system, according to exemplary embodiments.

In FIG. 18A, a flowchart of another operating procedure of the system is shown, according to an exemplary embodiment. Terrain awareness warning system 110 transmits a terrain profile characteristic signal to a central database (step 850). The central database stores the terrain profile characteristic signal (step 852). It should be noted that a plurality of terrain profile characteristic signals may be transmitted to the central database.

Figure 18B:
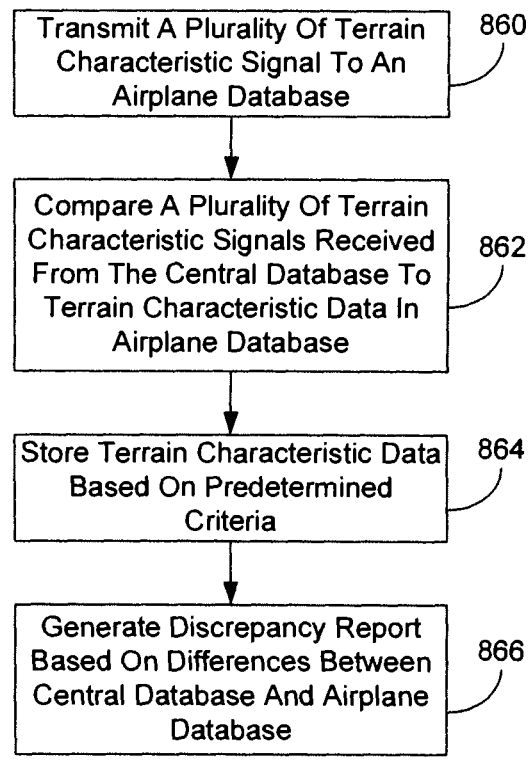

In FIG. 18B, another process flowchart for the system is shown, according to an exemplary embodiment. The central database transmits a plurality of terrain profile characteristic signals to an airplane database (step 860). An airplane processor compares the plurality of terrain profile characteristic signals received from the central database to terrain profile characteristic data already stored in the airplane's database (step 862). The airplane processor stores the plurality of terrain profile characteristic signals based on a predetermined set of criteria (step 864). In an exemplary embodiment, the system analyzes discrepancies between the plurality of terrain profile characteristic signals and the terrain profile characteristic signals already stored in the airplane's database to determine which value should be stored in the airplane's database. The system generates a report of the discrepancies between the plurality of terrain profile characteristic signals and the terrain profile characteristic signals already stored in the airplane's database (step 866).

Although specific steps are shown and described in a specific order, it is understood that the method may include more, fewer, different, and/or a different ordering of the steps to perform the function described herein.

The exemplary embodiments illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the terrain awareness warning system as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also, two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

What is claimed is:

1. In an aircraft including a forward-looking radar system configured to transmit and receive forward radar signals, a downward-looking radar system, and a display for receiving a display signal representative of a terrain, a terrain awareness system comprising:

a forward-looking terrain logic configured to be in communication with the forward-looking radar system and the downward-looking radar system, wherein the forward-looking terrain logic receives an altitude derived from a downward-looking radar signal from the downward-looking radar system, wherein the altitude represents a first distance between the terrain below the aircraft at a point where the downward looking radar signal strikes the terrain and the forward-looking terrain logic determines a second distance to a terrain cell from data derived from the forward radar signals, the terrain cell being in forward line of site of the aircraft, wherein the forward-looking terrain logic provides a warning if the altitude is less than threshold height, or if the second distance is less than a threshold distance, wherein the warning is provided without using a stored terrain data base.

2. The system of claim 1, wherein the forward-looking terrain logic is configured to transmit an alert signal to a display.

3. The system of claim 1, wherein the terrain awareness system further comprises a terrain display device configured to transmit a terrain image signal to the display based on a terrain signal.

4. The system of claim 1, wherein the terrain awareness system further comprises a premature descent alert logic.

5. The system of claim 1, wherein the terrain awareness system is in communication with at least one of a global positioning system, an inertial reference system and an air data computer.

6. In an aircraft including a first radar system configured to transmit a first radio frequency wave and receive a second radio frequency wave, a downward-looking radar system and a display for receiving a display signal representative of a terrain, a terrain awareness warning system comprising:

a means for providing a forward-looking terrain warning configured to be in communication with the first radar system and the downward-looking radar system to process a radar signal from the first radar system, wherein the means receives an altitude derived from a downward-looking radar signal of the downward-looking radar system, the altitude being a first distance between the terrain and the aircraft at a point where downward looking radar signal strikes the terrain, wherein the means provides a warning if the altitude is less than a threshold height, or if a terrain cell is within a second distance to the aircraft, the terrain cell being determined from data derived from the second radio frequency wave and associated with terrain in a forward line of site of the aircraft, wherein the warning is provided without comparing an aircraft position to a stored terrain data base.

7. The system of claim 6, wherein the means for providing is configured to transmit an alert signal to a display based on a terrain signal.

8. The system of claim 6, wherein the terrain awareness warning system further comprises a means for providing terrain display logic configured to transmit a terrain image signal to a display based on a terrain signal.

9. The system of claim 6, wherein the terrain awareness warning system further comprises a means for providing premature descent alert logic.

10. The system of claim 6, wherein the terrain awareness warning system is in communication with at least one of a global positioning system, an inertial reference system and an air data computer.

11. In an aircraft including a forward looking weather radar system configured to transmit and receive forward radar signals, a radio altimeter and a display for receiving a display signal representative of a terrain, an alert system comprising:

a processor receiving an altitude derived from the radio altimeter, wherein the processor determines a distance to a terrain from data derived from the forward radar signals, the terrain being in a forward line of site of the aircraft, wherein the processor provides an alert in response to the altitude being less than threshold height or the distance being less than a threshold distance, wherein the alert or warning is provided without using a terrain data base.

12. The system of claim 11, wherein terrain data derived from the radar altimeter and the data derived from the forward-looking weather radar system is compared to verify whether the aircraft has passed over a terrain location.

13. The system of claim 12, wherein the terrain location is one or more terrain cells.

14. The system of claim 13, wherein the terrain data is temporarily stored until the aircraft passes over the terrain location.

15. The warning system of claim 14, wherein the terrain data is provided to an off-board computer, the off-board computer providing a discrepancy report.

16. The system of claim 11, wherein the warning system further comprises a terrain display device configured to transmit a terrain image signal to the display based on a terrain signal.

17. The system of claim 11, wherein the terrain location warning system further comprises a premature descent alert logic.

18. The system of claim 11, wherein the warning system further comprises a ground proximity alert logic.

19. The system of claim 11, wherein a height of the terrain is determined by discontinuities or change in slope.

20. The system of claim 19, wherein the height is determined by change in slope.

* * * * *